(12) United States Patent
Howe

(10) Patent No.: US 9,306,977 B2
(45) Date of Patent: *Apr. 5, 2016

(54) STEALTH PACKET SWITCHING

(71) Applicant: Wayne Richard Howe, Irvine, CA (US)

(72) Inventor: Wayne Richard Howe, Irvine, CA (US)

(*) Notice: Subject to any disclaimer, the term of this patent is extended or adjusted under 35 U.S.C. 154(b) by 185 days.

This patent is subject to a terminal disclaimer.

(21) Appl. No.: 13/815,801

(22) Filed: Mar. 15, 2013

(65) Prior Publication Data

US 2014/0090011 A1    Mar. 27, 2014

Related U.S. Application Data

(60) Continuation of application No. 10/986,550, filed on Nov. 10, 2004, now Pat. No. 8,428,069, which is a continuation-in-part of application No. 10/947,487, filed on Sep. 22, 2004, which is a continuation-in-part of application No. 10/412,784, filed on Apr. 11, 2003, which is a division of application No. 09/375,135, filed on Aug. 16, 1999, now Pat. No. 7,324,510.

(60) Provisional application No. 60/519,108, filed on Nov. 12, 2003, provisional application No. 60/097,138, filed on Aug. 19, 1998.

(51) Int. Cl.
| | |
|---|---|
| *H04L 12/28* | (2006.01) |
| *H04L 29/06* | (2006.01) |
| *H04L 12/853* | (2013.01) |
| *H04J 3/06* | (2006.01) |
| *H04L 12/931* | (2013.01) |
| *H04L 12/947* | (2013.01) |

(52) U.S. Cl.
CPC ............ *H04L 63/20* (2013.01); *H04L 47/2416* (2013.01); *H04L 49/602* (2013.01); *H04J 3/0638* (2013.01); *H04J 3/0682* (2013.01); *H04L 49/205* (2013.01); *H04L 49/251* (2013.01)

(58) Field of Classification Search
USPC ...................... 370/230, 235, 389, 392, 395.1, 370/395.5–395.52, 428, 465–466, 474, 476
See application file for complete search history.

(56) References Cited

U.S. PATENT DOCUMENTS

| | | | | |
|---|---|---|---|---|
| 6,330,236 | B1 * | 12/2001 | Ofek et al. ..................... | 370/369 |
| 6,480,477 | B1 * | 11/2002 | Treadaway et al. ........... | 370/314 |

\* cited by examiner

*Primary Examiner* — Frank Duong

(57) ABSTRACT

Systems, methods, devices, and network architectures are disclosed for creating and implementing secure wireless, wired, and/or optical networks using specially modified "stealth" packets, cells, frames, and/or other "stealth" information structures. This enables stealth packets, network elements, and networks to have a low probability of detection, interception, and interpretation. The "stealth" packets, switches, networks, and methods provide invisibility or "cloaking" by modifying previously existing standards rules for packet structures, protocols, timing, synchronization, and other elements.

Stealth packets, network elements, and networks may be further enhanced with encryption techniques by encrypting various parts of, or the entire packet structure itself, for example, headers, preambles, payload, and/or other packet elements. Using encryption to modify the packet structure itself adds an entirely new level of encryption complexity, thus making the stealth communications orders of magnitude more difficult to decrypt than standard decryption techniques.

20 Claims, 14 Drawing Sheets

Exemplary Secure Stealth-enabled Network adjacent to and/or connected to Non-stealth-enabled node 27a Exemplary Alternative Stealth Preamble and/or Flag(s) with Non-Repeating Rule Violations for Synchronization Bits

| 27t Optional Example Non-repeat Rule Violation (Stealth) Sync bits. May be equal to, less than, or greater than Octet | 27t Optional Example Non-repeat Rule Violation (Stealth) Sync bits. May be equal to, less than, or greater than Octet | 27t Optional Example Non-repeat Rule Violation (Stealth) Sync bits. May be equal to, less than, or greater than Octet | 27t Optional Example Non-repeat Rule Violation (Stealth) Sync bits. May be equal to, less than, or greater than Octet | 27t Optional Example Non-repeat Rule Violation (Stealth) Sync bits. May be equal to, less than, or greater than Octet | 27t Optional Example Non-repeat Rule Violation (Stealth) Sync bits. May be equal to, less than, or greater than Octet | 27t Optional Example Non-repeat Rule Violation (Stealth) Sync bits. May be equal to, less than, or greater than Octet | 27r Optional Example Standard Start of Frame Delimiter or Rule Violation (Stealth) Start of Frame Delimiter (could have standard, extra, or fewer bits) |

27m Optional Rule Violation (Stealth) Start of Frame

FIG.8

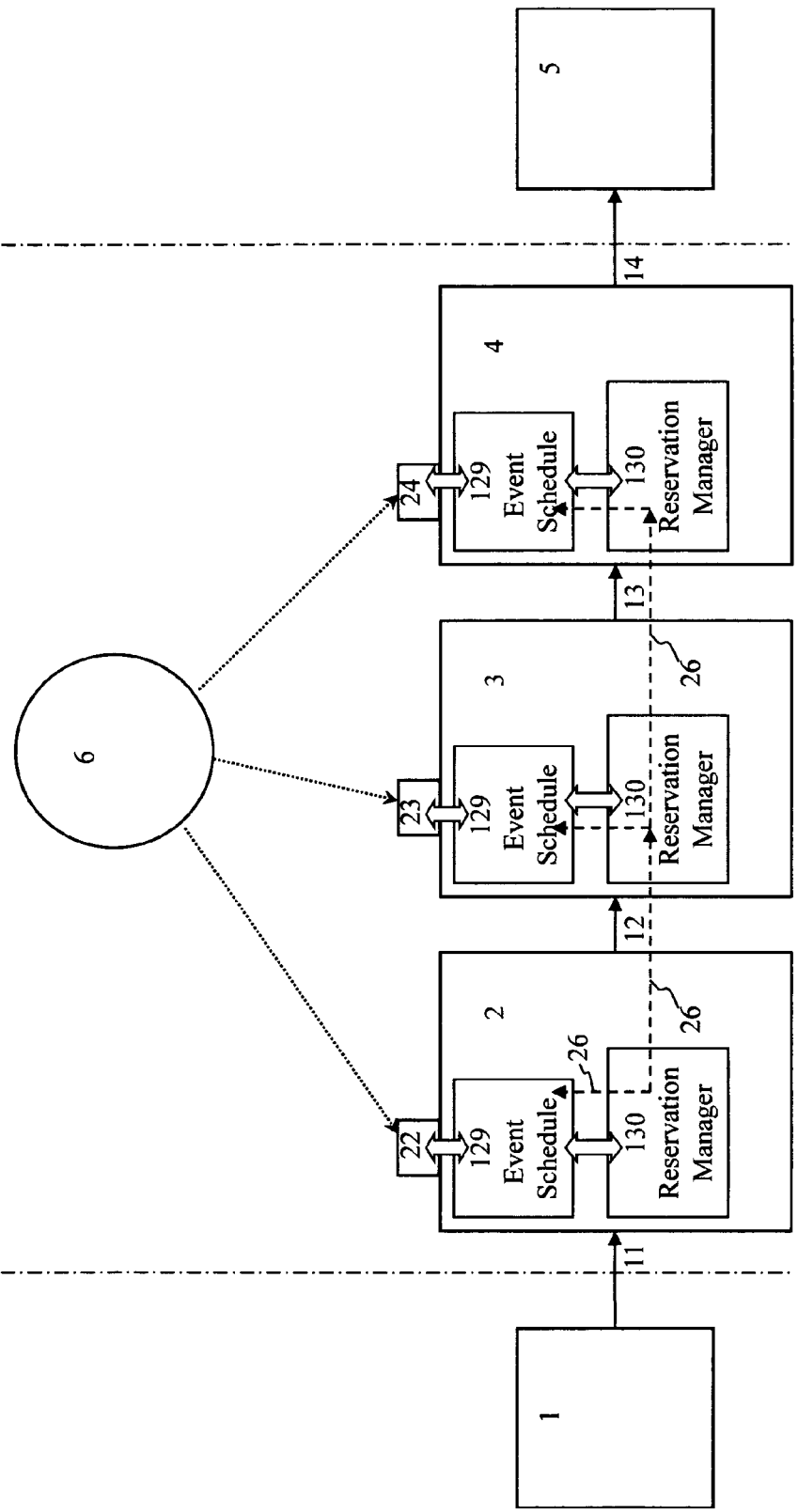

STEALTH PACKET SWITCHING

CROSS-REFERENCE TO RELATED APPLICATIONS

This application is a continuation of and claims the benefit of U.S. patent application Ser. No. 10/986,550, entitled "Stealth Packet Switching", filed Nov. 10, 2004, which is hereby incorporated by reference.

This application claims the benefit of U.S. Provisional Patent Application No. 60/519,108, filed Nov. 12, 2003, which is hereby incorporated by reference.

This application is a Continuation-In-Part and claims the benefit of United States Patent and Trademark Office patent application Ser. No. 09/375,135 entitled "Layer One Switching in a Packet, Cell, or Frame-based Network," filed Aug. 16, 1999, which is hereby incorporated by reference.

This application claims the benefit of U.S. Provisional Patent Application No. 60/097,138, entitled "Layer One Switching in a Packet, Cell, or Frame-based Network," filed Aug. 19, 1998, which is hereby incorporated by reference.

This application also claims the benefit of United States Patent and Trademark Office patent application Ser. No. 10/947,487 entitled "Time-Scheduled and Time-Reservation Packet Switching," filed Sep. 22, 2004, which is hereby incorporated by reference.

FIELD OF THE INVENTION

The present invention relates in general to secure ("stealth") communications in wired, wireless, and/or optical networks, including Wide Area Networks (WANs), Metropolitan Area Networks (MANs), Local Area Networks (LANs), Personal Area Networks (PANs), Storage Area Networks (SANs), inter-processor communications, and/or grid computing. It further relates to constructing, providing, transmitting, transferring, switching, routing, receiving, detecting, intercepting, interpreting, encrypting, decrypting, and/or deconstructing secure "stealth" packets, frames, cells and/or other information structures by authorized users; and/or preventing the detection, interception, interpretation, and/or decryption of secure "stealth" packets and/or other information structures by unauthorized users. It also relates to time-based, reservation-based, and/or layer one packet switching.

BACKGROUND OF THE INVENTION

Current packet, cell, and/or frame-based networks; network elements; network analyzers; and/or other network equipment and tools use standardized packet structures, methods, rules, and/or protocols as is well known to practitioners skilled in the art, e.g., ANSI standards, IEEE standards, such as IEEE 802 standards, IEEE 803 standards, and/or IETF (Internet Engineering Task Force) standards. This includes, but is not limited to standard preambles, headers, packet structures, protocols, header lookup methods, prioritization, transmission, encryption, decryption, routing, switching, and/or reception methods.

Packet switching devices, networks, methods, and architectures examine the packet structure for packet and protocol rule validation. These devices, methods, and architectures include, but are not limited to packet, cell, frame-style, synchronous, asynchronous, store-and-forward, cut-through, wireless, wired, optical, storage, processor-to-processor, grid computing, point-to-point, mesh, ring, contention, and/or non-contention networks. When packets and/or protocols adhere to standard rules, the packets, cells, and/or frames are detected, intercepted, interpreted, switched and/or routed normally. When packets and/or protocols violate these standard rules, then various mechanisms for handling rule violations may take place, including but not limited to packet discard.

It is well-known to those skilled in the art, that standard packets, cells, frames, and/or other information structures have standard rules which enable them to be processed as valid by switches, routers, network analyzers (for example, protocol analyzers), and/or other various network equipment, including authorized and/or unauthorized snoopers, sniffers, and/or other detectors. However, when rule violations occur in these standard packets, frames, cells, and/or other information structures, then standard switches, routers, and/or other network equipment detect the rule violation(s), assume that an error has occurred which makes the packet, cell, and/or frame invalid, and discards the packet, frame, cell and/or other information structure.

Encryption and/or decryption methods for communication and/or other information structures are also well known to those skilled in the art, e.g., well-known encryption methods exist such as DES, 3DES, AES, IPSEC, VPN, LEAP, EAP, RADIUS, WEP, RSA, RC4, SSL, etc. However, these methods are generally used to encrypt valid data in the packet and/or information structure itself, as opposed to being used to create and/or construct invalid packet structures and/or information structures themselves.

Various encoding methods are also well know to those skilled in the art, e.g., spread spectrum, wavelets, ultra wideband, discrete multi-tone, etc.

Concurrently, various methods, devices, network elements, architectures, and systems exist for time-based packet, frame, and/or cell switching/routing as described in U.S. Pat. No. 6,611,519, "Layer One Switching in a Packet, Cell, or Frame-based Network," by Howe, which is hereby incorporated by reference; U.S. patent application Ser. No. 10/947, 487 entitled "Time-Scheduled and Time-Reservation Packet Switching," filed Sep. 22, 2004, which is hereby incorporated by reference; as well as U.S. Provisional Patent Application No. 60/097,138, filed Aug. 19, 1998 by Howe, which is hereby incorporated by reference; United States Patent and Trademark Office Disclosure Document No. 431129, entitled "Fast, Guaranteed, On-Time Delivery of Real-Time Streaming Data in a Packet Switching Network," by Howe, which is hereby incorporated by reference; and United States Patent and Trademark Office Disclosure Document No. 500305, entitled "Layer One Switching in a Packet, Cell, or Frame-based Network," by Howe, which is hereby incorporated by reference.

This application claims the benefit of United States Patent and Trademark Office Disclosure Document No. 431129, entitled "Fast, Guaranteed, On-Time Delivery of Real-Time Streaming Data in a Packet Switching Network," which was filed in the United States Patent Office via US Certified Express Mail on Feb. 2, 1998, and received by the USPTO on Feb. 9, 1998. Said Disclosure Document No. 431129 was subsequently retained and referenced to said parent patent application Ser. No. 09/375,135, and is hereby incorporated by reference.

This application also claims the benefit of United States Patent and Trademark Office Disclosure Document No. 500305, entitled "Layer One Switching in a Packet, Cell, or Frame-based Network," which was filed in the United States Patent Office via US Certified Express Mail on Sep. 24, 2001, and received by the USPTO on Sep. 25, 2001. Said Disclosure Document No. 500305 is requested to be retained and referenced to this present Continuation-In-Part application, and is also hereby incorporated by reference.

These time-oriented approaches enable a packet, cell, frame, and/or other information structure, data structure, or format to be transferred, switched, and/or routed based upon time instead of (or in addition to) using information obtained from the packet header. Thus, these time-based routing techniques enable switching/routing of a totally-encrypted packet (including encrypted headers) through multiple-hops without having to decrypt the packet (and/or header) to determine the next hop.

Currently, there exists a need for security in packet, cell, and/or frame-based networks, including but not limited to, point-to-point networks, multi-hop networks, land-based networks, wired networks, wireless networks, optical networks, mobile networks, RFID networks, inter-chip (inter-processor) networks, grid-computing networks, storage networks, and/or any other type of communication and/or information network. The desire for security is expressed in, but is not limited to, the following needs:

Total invisibility (or "cloaking") of a secure packet, cell, and/or frame ("stealth packet") from unauthorized devices (including, but not limited to network monitors, analyzers, taps, and/or network radar) that might snoop and/or sniff the network.

If the packet is somewhat visible, then the packet should appear to be random noise, and not appear to be organized information.

If the packet appears to be organized information, the packet should violate various standard rules, so that it does not appear to be a packet, and is discarded.

If the packet is visible and/or appears to be information, then the packet should be totally encrypted, including headers and trailers, such that even source and/or destination are unknown to unauthorized devices that are able to intercept the packet, cell, and/or frame information.

If the packet is detectable, then its relationship to other related packets should not be detectable, e.g., packet 22 of a session should not be able to be related to another packet which is packet 23 (or any other packet from the same session). Similar sources and/or destinations, priorities, sessions, count numbers, etc., should not be identifiable, as they may lead to breaking the encryption algorithms and/or keys.

The packet should not require decryption at each node in the network for a multi-hop network, in order to be routable to the next node in the network.

If a packet is to be delivered within a secure network, then the secured ("stealth") packet should not be able to exit the secure network, even if the secure network is connected to one or more non-secure networks.

There should be guaranteed reliable information delivery, even when the network is under attack from viruses, data storms, loading, congestion, denial-of-service attacks, etc. Reliable delivery should be guaranteed even through loading, congestion, attacks, and/or other contention in point-to-point networks and mesh networks, as well as in shared-media networks such as wireless, CSMA/CA (Carrier Sense Multiple Access/Collision Avoidance), local area networks, CSMA/CD (Carrier Sense Multiple Access/Collision Detection, Ethernet, ring networks, Token-Ring, Aloha, any other wireless, wired, optical, and/or any other shared media networks which may experience congestion, collision, contention, and/or delays. This guaranteed delivery also should be achievable under loading, congestion, and/or contention for resources inside a switch, router, server, storage unit, and/or any other communication device, including but not limited to: input lines, input queues, priority queues, address lookup mechanisms, priority lookup mechanisms, switching fabrics, output queues, output lines, or any other resource sharing mechanisms in data switching or routing.

SUMMARY OF THE INVENTION

The foregoing problems and needs are solved and technical advances are achieved in accordance with the principles of this invention as disclosed in several structural embodiments and/or modifications of information structures, packet structures, protocols, switching devices, nodes, methods, techniques, networks, architectures, systems, synchronization methods, encoding methods, and/or timing.

It should be understood that the terms "packets", "cells", "frames", "sockets", "information structures", "information fragments", "information elements", etc., are various terms for structuring information at various network, computer, and/or storage layers (e.g., OSI—Open Systems Interconnect layers) for various purposes, including but not limited to: synchronization, addressing, routing, switching, prioritizing, ordering, numbering, error checking, ensuring delivery, maintaining relationships, retransmission, segmenting, combining, encrypting, packetizing, sampling, encoding, and/or any other method or protocol related to the structuring, processing, and/or distribution of information.

Thus, for the purposes of simplicity and generality in this document, the terms "packet" and/or "packets" may be used to include, but are not limited to, any information and/or pieces of information which are structured at various layers and/or combinations of layers. This includes but is not limited to packets, frames, cells, sockets, information structures, information fragments, information elements, and/or other pieces of information that may or may not violate the conventional rules of packets, cells, frames, sockets, information structures, information fragments, etc.

In its simplest form, "stealth packets", "stealth frames", "stealth cells", and/or "stealth information structures" violate standards rules. Thus, they provide Low Probability of Interception and/or Low Probability of Detection, as they are not detectable by standard packet, cell, and/or frame-based switches, routers, and/or other standard network analysis equipment and/or methods. Since a standard network element cannot "see", interpret, and/or route the stealth packets, frames, and/or cells, a stealth packet link and/or network enhances network security because stealth packets, frames, and/or cells are unable to leave the security bounds of a wireless, wired, and/or optical secure stealth network and enter into a standard wireless, wired, and/or optical non-secure network. Thus, the elements, devices, network architectures, systems, and methods of stealth switching enable multiple secure and non-secure networks to simultaneously co-exist and/or overlap one another without compromising secure communications.

Stealth techniques of rule violations may also be used in conjunction with encryption techniques to add another level of encryption and complexity, thus making the secure communications even more difficult to break.

When combined with time-based and/or time-reservation packet switching—as previously described in U.S. patent application Ser. No. 09/375,135 entitled "Layer One Switching in a Packet, Cell, or Frame-based Network" filed Aug. 16, 1999, which is hereby incorporated by reference—the stealth packet may be provided with: guaranteed delivery even through a totally congested network; timeliness due to time reservations; total encryption of the packet including header encryption through multiple hops, without decryption of headers at each hop; and other benefits.

Various objects and/or aspects of these inventions comprise but are not limited to the following:

I. Rule Violation aspects—Aspects of the invention (s) comprises devices, nodes, methods, networks, architectures, systems, packets, packet structures, packet transmission, packet switching, packet routing, packet transfer, and/or packet reception, based on rule violation(s) relating to packets, packet structures, formats, protocols, packet lengths (too long or too short), incorrect Byte organization, bit rate, timing, synchronization, encoding methods, predictable and/or knowable variations on the aforementioned, and/or any other rule violations which cause errors, misapprehensions, and/or in any way violate normal, expected, and/or anticipated rules and/or methods. Packet examination may or may not be used at each node if desired to determine rule violations. Rule violations may cause various network equipment to: be unable to analyze the packet(s) and/or incorrectly analyze the packet(s); be unable to analyze the protocol(s) and/or incorrectly analyze the protocol (s); be unable to analyze and/or incorrectly analyze the rules, structure, format, pattern, timing, synchronization, byte structure, bit rate, and/or encoding methods; be unable to switch, route, and/or transfer the packet(s); be unable to view the packet(s); view the packet(s) as invalid; view the packet(s) as noise; discard the packet(s); and/or not transfer the packet. This includes, but is not limited to:

Violations may occur in rules regarding packets, structure, format, length, pieces of packets, bytes, bits, noise, content, patterns, amplitude, phase, strength, frequency, timing, protocols, bit rates, encoding methods, synchronization methods, absence or modification of headers or other fields, removed bits, added bits, altered bits, and/or any other violation. Violations may be fixed, non-fixed, previously known, previously unknown, random, pseudorandom, variable, predictably variable, dynamic, rotating, and/or any other means or method of modifications of standards, expectations, and/or rules.

Packet rule violations may exist for entire packets, and/or one or more sections, fields, bytes, and/or bits of a packet, which may or may not include preambles, error checking, payload, etc.

Packets may be encrypted, not encrypted, and/or specific parts may be encrypted. Encryption may be fixed, non-fixed, previously known, previously unknown, random, pseudorandom, variable, predictably variable, dynamic, rotating, and/or any other means or method of encryption or partial encryption.

Packets may have preambles, no preambles, encrypted preambles, partially encrypted preambles, and/or secret preambles. Preambles may be fixed, non-fixed, previously known, previously unknown, random, pseudorandom, variable, predictably variable, dynamic, rotating, one-time pads, and/or any other means or methods of varying the preamble, synchronization bits, and/or start-of-frame delimiters.

Packets may or may not be headerless.

Protocols may be violated. For example, sequence numbers of packets and/or other protocol mechanisms may be altered in transmissions, responses, acknowledgement, negative acknowledgements, etc., such that the transmitter, receiver, and/or unauthorized transmitter/receiver become confused and must retransmit, re-receive, and/or abandon the session.

Any timing, synchronization, and/or encoding method(s) may (or may not) be used, and may (or may not) be violated, including any master clocks, synchronization pulses, synchronization packets, synchronization bits, preambles, etc.

II. Time-based aspects—Aspects of the invention(s) comprise devices, nodes, methods, networks, architectures, systems, packets, packet structures, packet transmission, packet switching, packet routing, packet transfer, and/or packet reception, based on timing such that no header lookup (packet examination) is required, although header lookup and/or other packet examination may be used if desired. This includes, but is not limited to:

Packets may be encrypted, not encrypted, and/or individual parts, bits, bytes, segments, and/or fields may be encrypted.

Packets may have preambles, encrypted preambles, partially encrypted preambles, secret preambles, or no preambles. Preambles may be fixed, non-fixed, previously known, previously unknown, random, pseudorandom, variable, predictably variable, dynamic, rotating, and/or any other means or methods of varying the preamble, synchronization bits, and/or start-of-frame delimiters.

Packets may or may not be headerless, headered, and/or partially headered.

Packets may or may not have packet, protocol, and/or any other rule violations.

Any timing and/or synchronization method(s) may be used, including any master clocks, synchronization pulses, synchronization packets, etc.

Information transfer standard times and/or secret times may be pre-established and/or exchanged for standard, secure, and/or secret sessions.

Times may be secretly generated and then shared and/or generated secretly at each individual authorized node by other means.

Sessions may be one or more fixed times, non-fixed times, recurring times, periodic times, time intervals, random times, pseudo-random times, predetermined times, times based upon a seed value, secret information, key, encryption method, shared keys, one-time pads, and/or any other method such that transmission, transfer, reception, switching and/or routing time may be determined secretly by one or more authorized parties.

III. Combinations of time-based and/or packet rule violation aspects—Aspects of the invention(s) may comprise devices, nodes, methods, networks, architectures, systems, packets, packet structures, packet transmission, packet switching, packet routing, packet transfer, and/or packet reception, based on any combinations of time-based packet routing and/or packet rule violation(s).

IV. Buffered and/or non-buffered aspects—Aspects of the invention(s) comprise devices, nodes, methods, networks, architectures, systems, elements, packets, packet structures, packet receivers, stealth packet interpreters, stealth packet translators, stealth packet de-constructors, packet transmitters, stealth packet assemblers, stealth packet constructors, packet switches, packet routers, packet transfer, and/or packet reception either with buffering and/or without buffering. Buffered and/or non-buffered aspects include, but are not limited to source devices, interim devices, termination devices, test devices, monitoring devices, management devices, bypass devices, cut-through devices, single fabric devices, dual or multiple fabric devices, and/or devices wherein various input and/or outputs are tapped off, split off, and/or switched in and out of the node and/or transfer path.

V. Session setup, teardown, and/or route establishment—Aspects of the invention(s) comprise devices, nodes, methods, networks, architectures, systems, packets, packet structures, packet transmission, packet switching, packet routing, packet transfer, and/or packet reception for session setup, teardown and/or other route establishment, including, but not limited to:

Permanent and/or fixed session (i.e., permanent virtual circuit-like) and/or on-demand and/or dynamic session (i.e., switched virtual circuit-like).

Centralized setup and/or teardown control (i.e., SS7-like, i.e., out-of-band signaling) and/or decentralized and/or distributed session setup and/or teardown control (i.e., CAS-like, i.e., in-band signaling).

Sessions may be established for a fixed path (e.g., RSVP—Resource Reservation Protocol, SIP—Session Initiation Protocol), and/or for multi-path (eg., IP—Internet Protocol).

VI. Network architecture aspects—Aspects of the invention(s) comprise devices, nodes, methods, networks, architectures, systems, packets, packet structures, packet transmission, packet switching, packet routing, packet transfer, and/or packet reception for shared media, non-shared media, wireless, LAN (Local Area Network), MAN (Metropolitan Area Network), WAN (Wide Area Network), SAN (Storage Area Network), PAN (Personal Area Network), inter-processor communication, and/or RFID (Radio Frequency Identification), including, but not limited to:

Shared media, (e.g., wireless, LANs, rings, etc.).
Point-to-point,
mesh (e.g., WAN, MAN, SAN, fiber, etc.).
Chip-to-chip communication and/or Grid Computing.

VII. Network boundary aspects—Aspects of the invention(s) comprise devices, nodes, methods, networks, architectures, systems, packets, packet structures, packet transmission, packet switching, packet routing, packet transfer, and/or packet reception which create network boundaries, outside of which, stealth packets cannot be effectively transferred.

Objects of the present invention for unauthorized and/or standard devices include, but are not limited to:

Provide invisibility (or "cloaking") of a secure packet, cell, and/or frame ("stealth packet") to unauthorized and/or standard devices (i.e., standard network monitors, analyzers, switches/routers and/or other network radar) that might snoop and/or sniff the network. This may be based on rule violations and/or alternative encoding or other methods which may or may not occur at pre-established times (e.g., ultrawideband transmission at specific times as part of, or instead of, normally encoded transmissions; wavelength hopping at specific times as part of, or instead of, normally encoded WDM (Wave Division Multiplexing) and/or DWDM (Dense Wave Division Multiplexing), akin to Frequency Hopping and Direct Sequence, and/or Orthogonal Frequency Division Multiplexing—spread spectrum techniques used in wireless transmissions today).

If the packet is somewhat visible, then make the packet appear to be random noise, and not appear to be organized information. This may be based on rule violations, and/or alternative encoding or other methods which may or may not occur at pre-established times (e.g., ultrawideband transmission at specific times as part of (e.g., simultaneously), or instead of, normally encoded transmissions; wavelength hopping at specific times as part of, or instead of, normally encoded WDM (Wave Division Multiplexing) and/or DWDM (Dense Wave Division Multiplexing), akin to Frequency Hopping and Direct Sequence, and/or Orthogonal Frequency Division Multiplexing—spread spectrum techniques used in wireless transmissions today).

If the packet appears to be organized information, it may violate various standard rules, such that it does not appear to be a valid packet, and is discarded, ignored, and or misinterpreted.

If the packet is visible and/or appears to be information, then it may be totally encrypted, including headers and trailers, such that even source and/or destination are unknown to unauthorized devices that are able to intercept the packet, cell, and/or frame information. This may be accomplished by various timing mechanisms, such that the way to decrypt, route, or otherwise interpret the packet is known by arrival time.

If the packet is detectable, then its relationship to other related packets should not be detectable, e.g., packet 22 of a session should not be able to be related to another packet which is packet 23 (or any other packet from the same session. Similar sources and/or destinations, priorities, sessions, count numbers, etc., should not be identifiable. This may be accomplished by rule violations, added garbage bits, deleted bits, transformations, substitutions, and/or total encryption (including headers) with interpretation determined by time.

The packet may not require decryption at each node in the network for a multi-hop network, in order to be routable to the next node in the network. This may be accomplished by rule violations and/or total encryptiori (including headers) with interpretation determined by decryption and/or arrival time.

If a packet is to be delivered within a secure network, then the secured ("stealth") packet should not be able to exit the secure network, even if the secure network is connected to one or more non-secure networks. This may be accomplished by rule violations and/or encryption (including headers) with interpretation determined by decryption and/or arrival time.

Objects of the present invention for authorized and/or secure devices include but are not limited to:

Establish visibility of a secure packet, cell, and/or frame ("stealth packet") to authorized secure devices (i.e., "stealth-enabled" network monitors, analyzers, switches/routers and/or other network radar) that may be authorized to snoop and/or sniff the network, and/or act upon the packet in an authorized way. This may be accomplished by knowing and correctly interpreting the rule violations and/or the arrival times.

Guarantee reliable delivery, even when under attack from hackers, viruses, data storms, excessive loading, congestion, shared media contention collision, and/or other delays. This also includes loading, congestion, and/or contention for resources inside a switch, router, and/or any other communications device, including but not limited to: input lines, input queues, priority queues, address lookup mechanisms, priority lookup mechanisms, memory devices, switching fabrics, output queues, output lines, or any other resource sharing mechanisms in data switching or routing. Reliable delivery may be accomplished by reserving absolute and/or relative transfer times (which may vary dynamically and/or be secret times) for packets which require guaranteed delivery.

DEFINITIONS

Throughout this disclosure, multiple devices, methods, and systems are described in various configurations using a variety of descriptive terms. Thus, for purposes of understanding the context, scope, and clarity of the present disclosure, the following definitions are provided.

The term violation as used in the present invention may include, but is not limited to any modification of or to: devices, nodes, methods, networks, architectures, systems, standards, standards rules, packets, packet structures, packet rules, information, information structures, information rules, data, data structures, data rules, cells, cell structures, cell rules, frames, frame structures, frame rules, transmission, transmission rules, format, protocols, bits, bytes, bit rate, encoding methods, timing methods, synchronization, packet switching, packet routing, packet transfer, and/or packet reception, and/or any other modifications which cause errors, misapprehensions, misreading, faults, inaccuracies, invalidity, discard, and/or in any way breach normal, expected, and/or anticipated rules and/or methods. Violations may include, but are not limited to: fixed, non-fixed, previously known, previously unknown, random, pseudorandom, variable, predictably variable, dynamic, rotating, and/or any other means or method of modifications of standards, expectations, and/or rules. Violations may cause various network equipment to: be unable to analyze the packet(s) and/or incorrectly analyze the packet(s); be unable to analyze the protocol(s) and/or incorrectly analyze the protocol (s); be unable to analyze and/or incorrectly analyze the rules, structure, format, pattern, bit rate, timing, synchronization, and/or encoding methods; be unable to switch, route, and/or transfer the packet(s); be unable to view the packet(s); view the packet(s) as invalid; view the packet(s) as noise; discard the packet(s); not transfer the packet; and/or in any other way be unable to process the information.

The term switching as used in the present invention describes multiple functions including, but not limited to the origination of data (as in a source network element); the reception of data (as in a destination network element); the transfer of data directly through a network element (as in pure layer one switching); and the reception, storage, and retransmission of data through a network element (with buffering). Consequently, the term switching in the present invention is defined as comprising at least, but is not limited to, one or more of the following operations: transferring, transferring to, transferring from, transferring over, transferring between, transmitting, communicating, sending, receiving, retransmitting, broadcasting, multicasting, uni-casting, switching, routing, relaying, storing, retrieving, forwarding, storing-and-forwarding, bypassing, passing through, tunneling, tunneling through, cutting through, and/or any other method of moving information either into a device, out of a device, or through a device.

The terms transmitting and transmission, as used in the present invention, are also used to describe the origination of data (as in a source network element—transmit from); the reception of data (as in a destination network element—received transmission); the transfer of data directly through a network element (as in pure layer one switching—transmitted through); and the reception, storage, and retransmission of data through a network element (with buffering—transmitted through). Thus, the terms transmitting and transmission are defined as comprising at least, but are not limited to, one or more of the following operations: transferring, transferring to, transferring from, transferring over, transferring between, transmitting, communicating, sending, receiving, retransmitting, broadcasting, multicasting, uni-casting, switching, routing, relaying, storing, retrieving, forwarding, storing-and-forwarding, bypassing, passing through, tunneling, tunneling through, cutting through, and/or any other method of moving information either into a device, out of a device, or through a device.

Information is defined as at least, but not limited to data communicable over a network. Information comprises, but is not limited to one or more of the following types of data: data that has been formatted in a packet, cell, or frame; data that has a header; data in which a header has been removed or replaced; voice data; video data; telephony data; video conferencing data; computer data; computer host data; computer network data; local area network data; stored data; retrieved data; scheduled data; guaranteed data; layer one data; layer two data; layer three data; layer four data; phone data; Internet phone data; packet phone data; Internet video conferencing data; video streaming data; audio streaming data; multimedia data; multimedia streaming data; broadcast data; multicast data; point-to-point data; emergency message data; time-dependent data; network control data; guaranteed delivery data; important data; urgent data; and/or any other data associated with layer one switching. Information also comprises data associated with, but not limited to, one or more of the following applications: browsers, web browsers, browser applications, graphics, viewers, electronic mail, voice, voice mail, video, video conferencing, shared white-boarding, analog to digital conversion, digitization, compression, packetization, de-packetization, de-compression, digital-to-analog conversion, real-time applications, computer applications, computer host applications, computer network applications, storage applications, storage network applications, database applications, retrieval applications, scheduled applications, guaranteed delivery applications, high-priority applications, Quality of Service (QoS) applications, Class of Service (CoS) applications, Type of Service (ToS) applications, layer one applications, layer one session applications, phone applications, Internet phone, Internet phone applications, packet phone applications, Internet video conferencing, video streaming, audio streaming, multimedia, multimedia streaming applications, broadcast applications, multicast applications, emergency system applications, time-sensitive applications, time-dependent applications, network control applications, guaranteed delivery applications, important information applications, and urgent information applications.

Information also comprises, but is not limited to, data associated with one or more of the following protocols: any data network protocols, computer network protocols, local area network protocols, Ethernet protocols, token ring protocols, internet protocols, intranet protocols, IP protocols including TCP/IP protocols and UDP/IP protocols, asynchronous transfer mode (ATM) protocols, X.25 protocols, 802.x protocols, 802.11 protocols, 802.16 protocols, wireless protocols, routing protocols, routed protocols, voice over IP protocols, voice mail protocols, storage network protocols, database protocols, retrieval network protocols, store-and-forward protocols, frame relay protocols, resource reservation protocols, bit stream reservation protocols, layer one protocols, layer two protocols, layer three protocols, layer four protocols, higher layer protocols, call or session setup protocols, call or session teardown protocols, cut-though protocols, flow protocols, asynchronous protocols, synchronous network protocols, and/or any other network or communication protocols.

A network element and/or device is defined as at least, but not limited to, one or more elements, components, subcomponents, mechanisms, sub-mechanisms, systems, subsystems, processors, nodes, and/or any other devices used in, attached to, or associated with a network of any sort. Network elements may comprise at least, but are not limited to, one or more of the following elements, components, subcomponents, mechanisms, sub-mechanisms, systems, subsystems, processors, nodes, and/or devices: pure layer one embodiments, layer two elements, layer three elements, layer four elements, end user embodiments, overlay embodiments, integrated embodiments, wireless embodiments, local area network embodiments, cut-through embodiments, source elements, destination elements, departure elements, combinations of source elements with other network elements, combinations of destination elements with other network elements, originating edge node elements, departure node elements, mid-destination elements, final destination elements, terminating edge node elements, and/or any other elements, components, subcomponents, mechanisms, sub-mechanisms, systems, subsystems, processors, nodes, or any other devices used in a network of any sort.

Network elements and/or devices may comprise at least, but are not limited to, one or more of the following devices, instruments, apparatus, mechanisms, and/or functional components: communications devices; telecommunications devices; data communications devices; hybrid network devices; network-attached devices; local area network-attached devices, such as local area network controllers, local area network bridges, local area network routers, local area network switches, and/or local area network hubs; browser devices; web browser devices; graphics devices; electronic mail devices; voice devices; video devices; video conferencing devices; real-time devices; end-user devices; computer devices; computer host devices; server devices; processor devices; microprocessor devices; integrated circuit devices; computer network devices; storage devices; retrieval devices; storage area network devices; memory devices; database devices; switching devices; routing devices; workstations; bridges; hubs; wireless devices; scheduled devices; guaranteed delivery devices; high-priority devices; layer one devices; phone-oriented devices, such as Internet phone devices, packet phone devices, private branch exchanges (PBXs), and telephone instruments; Internet video conferencing devices; video streaming devices; audio streaming devices; multimedia devices; multimedia streaming application devices; broadcast application devices; multicast application devices; emergency system application devices; time-sensitive application devices; time-dependent application devices; network control application devices; guaranteed delivery application devices; important information application devices; urgent information application devices; interconnection devices; gateways to other networks; and/or any other device, instrument, mechanism and/or functional component used in, associated with, and/or attached to a network of any sort.

Network elements and/or devices may be operable in at least, but not limited to, one or more of the following networks: communications networks, telecommunications networks, data communications networks, local area networks, Ethernet local area networks, ring-style local area networks, token-style local area networks, star-type local area networks, point-to-point networks, loop networks, arbitrated loop networks, multi-drop bus networks, wireless networks, fabric networks, voice networks, video networks, video conferencing networks, real-time networks, computer networks, processor networks, microprocessor networks, storage networks, retrieval networks, storage area networks, database networks, server networks, switching networks, routing networks, store-and-forward networks, cut-through networks, scheduled networks, guaranteed delivery networks, high-priority networks, layer one networks, phone networks, private branch exchange (PBX) networks, Internet phone networks, packet phone networks, Internet video conferencing networks, video streaming networks, audio streaming networks, multimedia networks, multimedia streaming networks, broadcast networks, multicast networks, emergency system networks, time-sensitive networks, time-dependent networks, network control networks, guaranteed delivery networks, important information networks, hybrid networks, urgent information networks, and/or any other networks which may be adapted to functionally carry out layer one switching.

Network elements and/or devices may be operable using at least, but not limited to, one or more of the following protocols: any data network protocols, computer network protocols, local area network protocols, Ethernet protocols, token ring protocols, internet protocols, intranet protocols, IP protocols including TCP/IP protocols and UDP/IP protocols, asynchronous transfer mode (ATM) protocols, X.25 protocols, wireless protocols, 802.x protocols, 802.11 protocols, 802.16 protocols, routing protocols, routed protocols, voice over IP protocols, voice mail protocols, storage network protocols, database protocols, retrieval network protocols, store-and-forward protocols, frame relay protocols, resource reservation protocols, bit stream reservation protocols, layer one protocols, layer two protocols, layer three protocols, layer four protocols, higher layer protocols, call or session setup protocols, call or session teardown protocols, cut-though protocols, flow protocols, asynchronous protocols, synchronous network protocols, and/or any other network or communication protocols.

Network elements and/or devices may be associated with at least one or more of the following applications: browsers, web browsers, browser applications, graphics, viewers, electronic mail, voice, voice mail, video, video conferencing, analog to digital conversion, digitization, compression, packetization, de-packetization, de-compression, digital-to-analog conversion, real-time applications, computer applications, computer host applications, computer network applications, storage applications, storage network applications, database applications, retrieval applications, wireless applications, RFID applications (Radio Frequency Identification) applications, scheduled applications, guaranteed delivery applications, high-priority applications, Quality of Service (QoS) applications, Class of Service (CoS) applications, Type of Service (ToS) applications, layer one applications, layer one session applications, phone applications, Internet phone, Internet phone applications, private branch exchange (PBX) applications, packet phone applications, Internet video conferencing, video streaming, audio streaming, multimedia, multimedia streaming applications, broadcast applications, multicast applications, emergency system applications, time-sensitive applications, time-dependent applications, network control applications, guaranteed delivery applications, important information applications, and/or urgent information applications.

Network elements and/or devices may comprise and/or be associated operationally with at least one or more of the following elements and/or components: microprocessors, processors, integrated circuits, application specific integrated circuits, programs, memory, program memory, stored memory, random access memory (RAM), memory devices, storage, storage devices, queues, buffers, shift registers, RFID (Radio Frequency Identification) elements or tags, and/or switching elements.

The terms synchronizing and synchronization are defined as comprising at least, but are not limited to, one or more elements, mechanisms, methods and/or schemes for establishing, coordinating, and/or maintaining timing in one or more network elements and/or devices. Synchronizing and synchronization may be achieved by, but are not limited to, utilizing one or more of the following elements, mechanisms, methods, and/or schemes: master clock; central clock; receiver clock; Global Positioning System; differential Global Positioning System; synchronization transmitter; synchronization receiver; synchronization transmission media; atomic clocks; cesium clocks; rubidium clocks; hydrogen maser clocks; quartz clocks; satellite-based clocks; transit navigational satellite clocks; GOES satellite clocks; telecommunications synchronous network systems; wireless clocks; LORAN clocks; TV clocks; WWVB radio clocks; radio phone clocks; local radio clocks; land-based clocks with physical interconnections such as copper wire, cable, microwave or fiber; central office clocks; sea-based clocks; any other accurate clocks; in-band synchronization; out-of-band synchronization; local area network synchronization clocks; pulses; master pulses; propagation delay; pulses plus propagation delay; synchronization pulses; synchronization pulses on transmission lines; synchronization signals; wireless synchronization pulses; synchronization bits; synchronization bits from one or more packets; synchronization packets; synchronization cells; synchronization frames; beacon packets; beacon frames; loose synchronization; close synchronization; synchronization within a safety zone time window; synchronization by comparison of expected packet, cell, or frame arrival time to actual packet, cell, or frame arrival time; synchronization based on previous packet, cell, or frame arrival time; common mode time transfer; absolute time synchronization; relative time synchronization; clock fly-overs; common-view mode; multi-satellite common view mode; time-stamped clock information; time codes; two-way time transfer; one-way time transfer; Network Transfer Protocol; Network Time Protocol; Real Time Protocol; and any other elements, mechanisms, methods and/or schemes used for establishing, coordinating, and/or maintaining timing in one or more network elements and/or devices.

A synchronization component is defined as at least, but not limited to one or more elements and/or mechanisms used for synchronization of one or more distributed network elements or devices. Synchronization components may comprise at least, but are not limited to one or more of the following elements and/or mechanisms: master clock; central clock; Global Positioning System; differential Global Positioning System; synchronization transmitter; synchronization receiver; synchronization transmission media; atomic clocks; cesium clocks; rubidium clocks; hydrogen maser clocks; quartz clocks; satellite-based clocks; transit navigational satellite clocks; GOES satellite clocks; telecommunications synchronous network systems; wireless clocks; RFID clocks, LORAN clocks; TV clocks; WWVB radio clocks; radio phone clocks; local radio clocks; land-based clocks with physical interconnections such as copper wire, cable, microwave or fiber; central office clocks; sea-based clocks; any other accurate clocks; in-band synchronization; out-of-band synchronization; local area network synchronization clocks; pulses; master pulses; propagation delay; pulses plus propagation delay; synchronization pulses; synchronization pulses on transmission lines; synchronization signals; wireless synchronization pulses; synchronization bits; synchronization bits from one or more packets; synchronization packets; synchronization cells; synchronization frames; beacon packets; beacon frames; loose synchronization; close synchronization; synchronization within a safety zone time window; comparison of expected packet, cell, or frame arrival time versus actual packet, cell, or frame arrival time; synchronization based on previous packet, cell, or frame arrival time; and/or any other elements or mechanisms used for synchronization of one or more distributed network elements or devices.

A reservation schedule is defined as at least, but not limited to, one or more elements and/or mechanisms used to reserve one or more times for the operation of switching, transferring, transmitting, bypassing, or receiving information. A reservation schedule may comprise at least, but is not limited to, one or more of the following elements and/or mechanisms: one or more specific times; one or more absolute times; one or more relative times; one or more periodic times and/or periodic time intervals; one or more repeating times; one or more non-periodic times; one or more start times; one or more completion and/or end times; one or more sources and/or one or more destinations, which may include internal ports or addresses as well as external ports or addresses; and availability status for said times, said sources, and/or destinations, such as available, unavailable (reserved), or tentatively scheduled.

The terms open and opening include but are not limited to establishing a connection through one or more network elements. The terms close and closing include but are not limited to a connection through one or more network elements.

A time-based connection is defined as a connection into, out of, through, or around a device and/or network element based upon a time schedule. Said time-based connection may be determined based upon time as opposed to header information, although header information may be used for call setup and in the originating edge node. A time-based connection may or may not include buffering.

Connection media into and out of time-based switching devices and/or network elements may comprise one or more of, but is not limited to, the following connection media: electrical media, wire media, copper wire media, cable media, coaxial cable media, microwave media, wireless media, optical media, and fiber media.

The terms store-and-forward switching, store-and-forward switch, and/or store-and-forward switching component, as used in the present invention refer to any layer two or higher-layer packet-based, cell-based, or frame-based data switching network element, device, instrument, apparatus, mechanism, and/or component. Store-and-forward switching, store-and-forward switches, and/or store-and-forward switching components may comprise at least, but are not limited to, one or more of the following layer two or higher-layer network elements, devices, instruments, apparatus, mechanisms, and/or components: communications devices; telecommunications devices; cut-through switches; cut-through devices; data communications devices; hybrid network devices; network-attached devices; local area network-attached devices, such as local area network controllers, local area network bridges, local area network routers, local area network switches, and/or local area network hubs; browser devices; web browser devices; graphics devices; electronic mail devices; voice devices; video devices; video conferencing devices; real-time devices; end-user devices; computer devices; computer host devices; server devices; processor devices; microprocessor devices; integrated circuit devices; computer network devices; storage devices; retrieval devices;

storage area network devices; memory devices; database devices; switching devices; routing devices; workstations; bridges; hubs; wireless devices; RFID devices; scheduled devices; guaranteed delivery devices; high-priority devices; phone-oriented devices, such as Internet phone devices, packet phone devices, private branch exchanges (PBXs), and telephone instruments; Internet video conferencing devices; video streaming devices; audio streaming devices; multimedia devices; multimedia streaming application devices; broadcast application devices; multicast application devices; emergency system application devices; time-sensitive application devices; time-dependent application devices; network control application devices; guaranteed delivery application devices; important information application devices; urgent information application devices; interconnection devices; gateways to other networks; and/or any other layer two or higher-layer device, instrument, and/or mechanism used in, associated with, or attached to a network of any sort.

Store-and-forward switching, store-and-forward switches, and/or store-and-forward switching components may comprise at least, but are not limited to, one or more of the following layer two or higher-layer network protocols: any data network protocols, computer network protocols, local area network protocols, Ethernet protocols, token ring protocols, internet protocols, intranet protocols, IP protocols including TCP/IP protocols and UDP/IP protocols, asynchronous transfer mode (ATM) protocols, X.25 protocols, wireless protocols, 802.x protocols, 802.11 protocols, 802.16 protocols, routing protocols, routed protocols, voice over IP protocols, voice mail protocols, storage network protocols, database protocols, retrieval network protocols, store-and-forward protocols, frame relay protocols, resource reservation protocols, bit stream reservation protocols, layer two protocols, layer three protocols, layer four protocols, higher layer protocols, call or session setup protocols, call or session teardown protocols, cut-though protocols, flow protocols, asynchronous protocols, synchronous network protocols, and/or any other layer two or higher-layer network or communication protocols.

Time-based switching circuitry is defined as circuitry capable of establishing a physical time-based connection into, out of, through, and/or around a network element. Time-based switching circuitry may or may not include buffering and various input to output switching components. Time-based switching circuitry may comprise a non-blocking, non-delaying switching fabric; but it may also comprise a blocking and/or delaying switching fabric. In addition, when used with buffering and other input and output switching elements, the time-based switching circuitry may be caused to act like a non-blocking, non-delaying switch time-based switch; or it may be caused to act like a blocking and/or delaying time-based switch.

Bypass switching circuitry is defined as circuitry capable of establishing a physical connection and/or a time-based connection into, out of, through, and/or around a layer two or higher-layer device and/or network element. Bypass switching circuitry may or may not include buffering. Bypass switching may utilize time-based switching circuitry. Bypass switching circuitry may utilize separate switching fabric from the layer two and/or higher-layer device it bypasses; or the bypass switching circuitry may utilize the same switching fabric as the layer two or higher-layer switching circuitry, such that a single switching fabric is used for both functions, which may also be called layer one cut-through switching or layer one tunneling.

BRIEF DESCRIPTION OF THE DRAWINGS

FIG. 5B comprises optional illustrative exemplary preamble sync bits 27a1, followed by an exemplary rule violation (stealth) Start of Frame Delimiter 27q.

FIG. 8 shows an exemplary alternative stealth preamble and/or flag(s) with non-repeating rule violations for synchronization bits 27a, as illustrated by optional rule violations of non-repeating synchronization bits 27t, and/or optional rule violations of start-of-frame delimiter bits 27r.

FIG. 14 illustrates exemplary secret transfer times which may be exchanged among various nodes 2, 3, 4 and/or end-user devices 1, 5 such that secret transfer times are established for various stealth packets and/or encrypted information structures.

DETAILED DESCRIPTION

Figure 1:
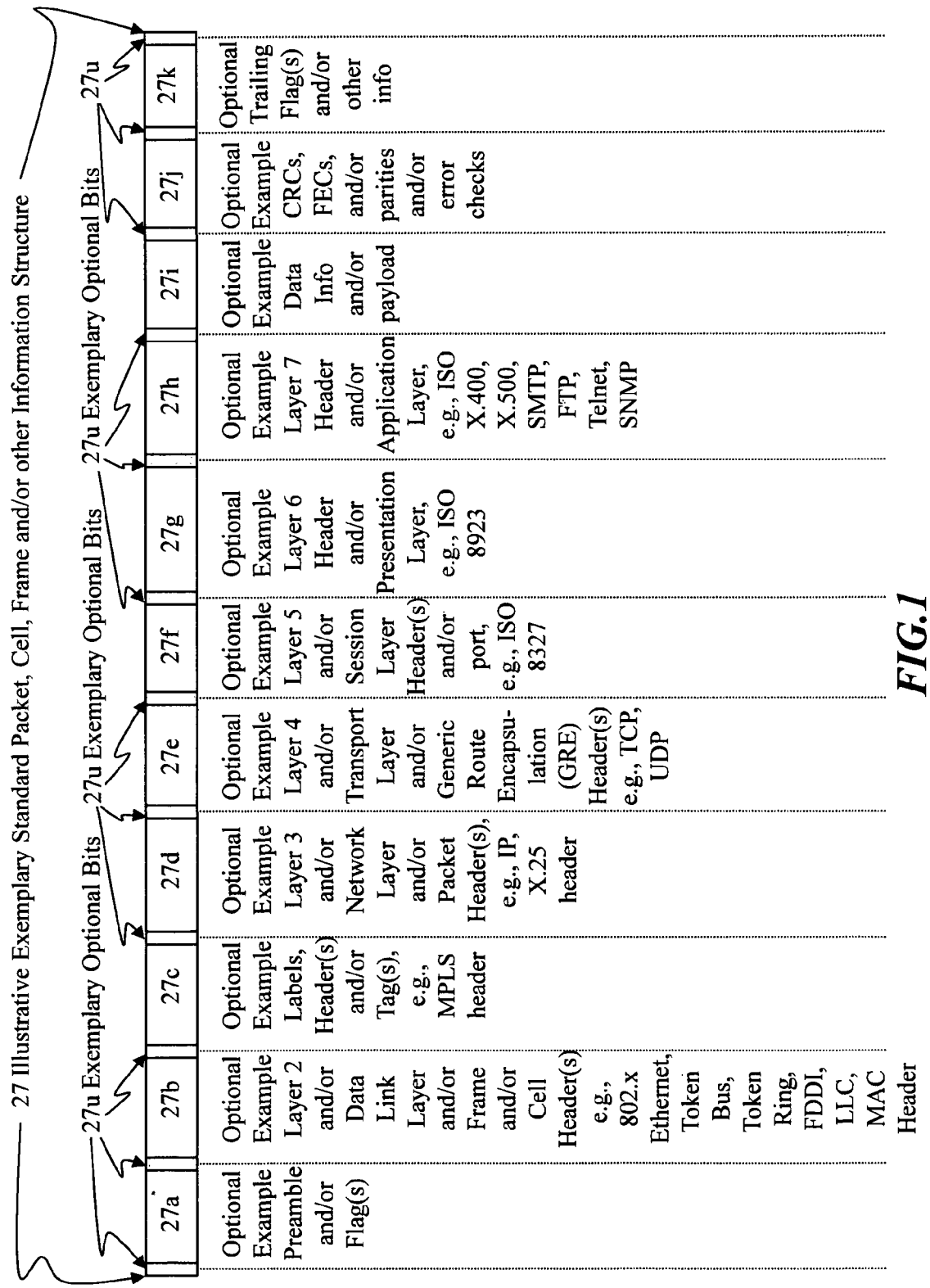
FIG. 1 shows an illustrative exemplary packet, cell, frame and/or other information structure 27, in an exemplary standardized format, with exemplary optional fields 27a-27k, and exemplary optional bits 27u.

I. Rule Violation aspects—Stealth packets and stealth packet switching may comprise rule violation(s). Rule violations may cause errors, faults, and/or other inabilities in network devices, elements, methods, networks, architectures, network analysis, network management, network monitoring, network billing, and/or other network equipment and/or network functions to correctly analyze, understand, and/or operate.

Intentional, purposeful, planned, premeditated, deliberate, and/or calculated rule violations may be used to provide stealth packets, stealth packet functionality, and/or other means and/or methods which will cause information and/or methods to be invisible, unseen, ignored, seen as noise, thrown away, and/or discarded by normally functioning network equipment and/or methods.

However, stealth packets and/or stealth packet technology may be seen and/or analyzed by correctly designed stealth-packet equipment, which can intercept, detect, correctly interpret, and/or process packets with the rule violations. Stealth packet equipment may include means and/or methods to transmit, transfer, receive, intercept, detect, interpret, and/or analyze information which may violate rules.

This means that any rule violations created by the stealth packets would be visible to stealth packet technologies and equipment using stealth methods. Thus, stealth packet equipment in a network would be able to originate, transmit, transfer, receive, switch, route, intercept, detect, interpret, construct, deconstruct, reconstruct, and/or analyze information with rule violations. Non-stealth packet equipment would not be able to originate, transmit, transfer, receive, switch, route, intercept, detect, interpret, and/or analyze information with rule violations. Therefore, stealth information would be transferable through a network in a secure way without being seen by normal network equipment. Further stealth packets would not be able to exit the secure area of the network into the non-secure area, as the non-secure area of the network would not be able to see and/or route the rule-violating packets correctly.

In the rule-violation approach, any rule violation may be used. This includes, but is not limited to, rule violation(s) of packets, packet structure, packet format, packet length, and any and all protocol violations and/or non-standard protocol usage, definitions violations, content violations, pattern violations, bit rate violations, encoding violations, and/or any other rule violations which may cause errors, misapprehensions, misunderstandings, miscommunications, invalidities, and/or in any way may violate normal, expected, and/or anticipated rules, procedures, formats, and/or methods.

Rule violations may comprise encryption, non-encryption, and/or partial encryption of any bit or field in the information structure, including packet structure modification such as adding bits, deleting bits, rearranging bits, transposing bits, substituting bits, and/or permutation of bits. For example, one or more "garbage" bits may be inserted at various fixed and/or dynamically changing points and/or times in the information structure for stealth-enabled transmission; and removed in the stealth-enabled deconstruction and/or interpretation process. Bits which may be redundant, non-changing, previously known, and/or non-essential may be removed in a fixed, dynamic, and/or pseudorandom manner. For example, the first bit (Individual/Group bit) in the source address field of the IEEE 802.11 MAC (Media Access Control) identifier is always set to 0 (zero) to indicate that the source is an individual station. This bit could be deleted when the stealth packet is constructed for transmission, and then reinserted at the receiver when the stealth packet is deconstructed. In addition to causing packet discard, these insertions, deletions, and/or transpositions of one or more bits at the packet structure level should greatly increase unauthorized decryption complexity by multiple order of magnitude. Packet structure modifications may include, but are not limited to one or more bits in various fields such as address fields, protocol version, type code (e.g., 0x0800 for IP—Internet Protocol; 0x0806 for ARP—Address Resolution Protocol), Duration bits, Frame Check Sequence, Frame Classes, various frames such as control frames (e.g., Request to Send, Clear to Send, Acknowledgement, Negative Acknowledgement, Polls, etc.) Management frames, Data frames, etc., as are well known to those skilled in the art.

Rule violations may comprise headered, headerless, and/or partially headered information.

Rule violations may comprise preambles, no preambles, partial preambles, encrypted preambles, partially encrypted preambles, and/or secret preambles. Preambles may be fixed, non-fixed, previously known, previously unknown, random, pseudorandom, variable, predictably variable, dynamic, rotating, and/or any other means or methods of varying the preamble, synchronization bits, and/or start-of-frame delimiters.

II. Time-based aspects—Stealth packets and stealth packet switching may comprise switching/routing packets based on timing and/or reservations, such that header lookup is not required. Time-based and/or reservation-based approaches include, but are not limited to, various device embodiments, nodes, methods, networks, architectures, techniques, and systems as disclosed in U.S. Pat. No. 6,611,519, issued Aug. 26, 2003, "Layer One Switching in a Packet, Cell, or Frame-based Network" by Howe; as well as U.S. Provisional Patent Application No. 60/097,138, filed Aug. 19, 1998 by Howe; United States Patent and Trademark Office Disclosure Document No. 431129, entitled "Fast, Guaranteed, On-Time Delivery of Real-Time Streaming Data in a Packet Switching Network," by Howe; and United States Patent and Trademark Office Disclosure Document No. 500305, entitled "Layer One Switching in a Packet, Cell, or Frame-based Network," by Howe. These time-oriented approaches enable a packet, cell, or frame to be switched, and/or routed based upon time instead of information in the packet header.

A time-based packet which arrives at a time-based node at a specific time may be switched without having to examine the packet. Thus, in this approach, a packet may be non-encrypted, encrypted, and/or partially encrypted, and it will still be switched and/or routed to its proper destination based on time.

In the time-based approach, device embodiments, nodes, methods, networks, architectures, techniques, and systems may utilize means for a master clock; means for synchronization of clocks in distributed network elements; means for switching within each network element; means for scheduling and executing calls or sessions in each network element; means for controlling said synchronization means, said switching means, and said scheduling and execution means in each network element; and the resulting system or network architecture wherein all network element inputs and outputs on a given path may switch their packets, cells, or frames in a cut-through and/or bypass manner, either with buffering and/or without buffering, such that packet's are routed through the nodes at the correct scheduled time(s) without requiring packet examination. Nevertheless, packet examination may also be used in the time-based approach if desired.

Thus, the packet device embodiments in the network are time-synchronized. Time synchronization may comprise synchronization packets, beacon packets and/or beacon frames, e.g., as may be used in IEEE 802.11 wireless standards which may provide time synchronization and/or any other methods of synchronizing. A source, destination, mid-node, or non-related node may set up a time-based reservation schedule with certain network elements and/or devices for transmitting secure, stealth, non-secure, and/or non-stealth packets. This setup may be controlled and/or scheduled centrally (e.g., SS7-like—Signaling System 7, i.e., out-of-band signaling) and/or it may be controlled and/or scheduled in a direct and/or distributed manner (e.g., CAS-like—Channel Associated Signaling, linearly, in-band, and/or in a point-to-point manner). At the specific predetermined scheduled time(s), the devices on the scheduled path through the network switch the appropriate input and output lines to cut-through and/or bypass their standard packet switches, mechanisms, and/or switch fabrics, and switch/route/transfer/open a connection, either with buffering and/or without buffering, from one end of the network to the other based upon the timing, schedule, reservation, and/or itinerary. The specific scheduled secure and/or stealth packets are transmitted from node to node based on timing, either with buffering or without buffering, such that the stealth packets propagate directly through the time-scheduled path to the other end of the network. In this way, they may avoid the packet header lookup mechanisms (i.e., packet examinations) at the various network nodes.

In cases where the time-based stealth packet is totally or partially encrypted, including header encryption, that packet may be switched by arrival time and need not be decrypted at each node in the path to read the header and determine the next routing link. Instead, the packet need only be decrypted at the end-user destination. This significantly decreases the potential for security breaches.

If the time-based packet is totally or partially encrypted (including header(s)) and encounters a non-stealth network node, then the non-stealth network node will not have enough information and/or knowledge to route and/or analyze the packet. It consequently discards the packet, and/or the non-stealth network node incorrectly reads the header and/or contents and routes the encrypted packet to an incorrect and/or false destination.

Likewise, if the time-based packet is totally or partially encrypted (including header(s)) and encounters a non-stealth network device, e.g., a non-stealth network analyzer, then the non-stealth network device will not have enough correct information to analyze the packet. The non-stealth network device consequently discards the packet, and/or incorrectly reads the encrypted header and/or packet, and at best performs an invalid action.

One of the benefits of time-based stealth packets is that they may have a scheduled time which enables them to switch/route through totally congested networks, such that delivery, reliability, and/or timeliness guarantees may be met.

III.—Combinations of rule violations and time-based packets—Various combinations of time-based packets and/or rule violations may be used. If the time-based packet has rule-violations (e.g., encrypted, not encrypted, partially encrypted, too short, too long, etc.) and encounters a non-stealth network node and/or device, then said non-stealth network node and/or device will detect the rule violation and discard the packet. This approach prevents the packet from leaving the secure network and/or a secure area of the network; even if the time-based rule-violating packet somehow encounters or is intercepted by a non-time-based switch/router or other non-time-based device. Thus, intentional packet rule violations prevent the stealth packet from being detected and/or routed by conventional means.

The combination of time-based rule violation packets that are encrypted or partially encrypted may be routed and/or switched without requiring header lookup (packet examination) at the appropriate network nodes. This means that these packets do not have to be decrypted at any intermediate nodes. Total security is obtained and maintained because the packet need only be decrypted by the final receiving destination.

If the time-based stealth packet is totally encrypted (including header encryption), and/or in some other way has packet rule violations, then the packet will not be able to be detected and/or routed by any standard node and/or equipment that is not stealth packet-aware.

In the time-based rule violation approach, standard nodes at the boundary of the secure network, will either not receive stealth packets, or will discard them due to rule violations. Thus, stealth packets will not be able to be detected and/or routed outside of secure network boundaries. This provides an extremely secure packet switching capability.

IV. Buffered and/or non-buffered aspects—Time-scheduled packet devices, elements, networks, and methods may transfer the information with or without buffering at one or more points for transmission, transfer, routing, switching, and/or other analysis. The time-scheduled information may flow through one or more network devices without buffering, either at a layer one physical layer and/or at a higher layer. Analysis of the packet may occur as it flows through in a buffered or an un-buffered manner. An example of this may include, but is not limited to pure optical switching, where the optical signal is not buffered, but a monitor circuit may examine the packet as it flows through the device.

Similarly, rule-violation "packets" of information may also be transferred with or without buffering at various devices. Non-buffering flow-through style transfer may be facilitated by using cut-through techniques which route the packet continuously through the node, even though the packet header is examined. Encrypted packet headers may use encrypted header lookup tables to route the packet either with or without buffering.

Similarly, combination time-based information and rule violation information may be transferred with or without buffering at various one or more nodes in the network.

V. Session setup and/or teardown—Session setup, maintenance, and/or teardown may be established with standard packets as is well known to those skilled in the art. Sessions may be permanent, fixed, on-demand, and/or dynamic sessions with centralized control and/or decentralized control, and with time-based information stored in one or more outside locations (i.e., servers) and/or in the network nodes themselves.

Session setup, maintenance, and/or teardown for time-based packets is disclosed in U.S. Pat. No. 6,611,519, issued Aug. 26, 2003, "Layer One Switching in a Packet, Cell, or Frame-based Network" by Howe; as well as U.S. Provisional Patent Application No. 60/097,138, filed Aug. 19, 1998 by Howe; United States Patent and Trademark Office Disclosure Document No. 431129, entitled "Fast, Guaranteed, On-Time Delivery of Real-Time Streaming Data in a Packet Switching Network," by Howe; and United States Patent and Trademark Office Disclosure Document No. 500305, entitled "Layer One Switching in a Packet, Cell, or Frame-based Network," by Howe. Sessions may be done in a permanent, fixed, on-demand, and/or dynamic session with centralized control and/or decentralized control, with time-based information stored in one or more outside locations (i.e., servers) and/or in the network nodes themselves.

Session setup, maintenance, and/or teardown may also be established with rule-violating, encrypted, and/or partially encrypted packets. This enables secure sessions to be established in a secure manner, such that the establishment, maintenance, and disestablishment of a session is rendered secret, secure, and/or not perceived.

VI. Network architecture—Once a secure and/or stealth packet has been transferred from, through, and/or into a network node, the node device may revert to standard packet switching. In this way, the system works to optimum advantage and efficiency for both secure and non-secure packets.

Rule Violation Network Architecture—Rule violation architecture may comprise non-timed and/or non-synchronized nodes as well as timed and/or synchronized nodes. In rule-violation architecture, the "stealth-enabled" node examines the "stealth packet" (buffered or non-buffered), detects the standard rule violation(s), but also knows the correct action(s) to take with the packet and/or information fragment in spite of and/or because of the rule violation. Thus a rule-violation architecture may comprise standard switches/routers and/or time-based switches/routers which have been modified and/or designed to detect rule-violations, but to act in a specific desired way, instead of merely discarding the packet(s) and/or information fragment(s) involved in the rule violation.

Time-based Network Architecture—The network architecture for time-based packets may consist of means for a master clock; time synchronization receiver means for synchronizing a clock on each network element; a source, which may be a network element, also variously termed an originator or a caller; a departure router/switch, which is a network element, also variously termed a departure switch, a departure node, or an originating edge node; mid-destination routers, which are network elements, also variously termed mid-destination switches, internal nodes, or middle nodes; a final destination router, which is a network element, also variously termed a final-destination switch, or terminating edge node; a receiver which may be a network element, also termed a called party; and transmission paths of any media connecting the network elements. The network architecture may also include network elements which determine and/or communicate preferred (best, optimal, quickest, most efficient, etc.) routes and/or preferred (best, optimal, quickest, most efficient, etc.) times for data transfer.

Network architecture for time-based packets—including but not limited to device embodiments, methods, session setup, session teardown, timing, synchronization, etc.—is disclosed in U.S. Pat. No. 6,611,519, issued Aug. 26, 2003, "Layer One Switching in a Packet, Cell, or Frame-based Network" by Howe; as well as U.S. Provisional Patent Application No. 60/097,138, filed Aug. 19, 1998 by Howe; United States Patent and Trademark Office Disclosure Document No. 431129, entitled "Fast, Guaranteed, On-Time Delivery of Real-Time Streaming Data in a Packet Switching Network," by Howe; and United States Patent and Trademark Office Disclosure Document No. 500305, entitled "Layer One Switching in a Packet, Cell, or Frame-based Network," by Howe. These documents are hereby incorporated by reference. Network architectures may include centralized control and/or decentralized control, with time-based information stored in one or more outside locations (i.e., servers) and/or in the network nodes themselves.

Synchronization—The time-based architecture is such that a master clock, sync packet, beacon packet, beacon frame, and/or any other master clock means may synchronize the device embodiments using receiving synchronization means. The master clock may comprise the combined master clocks on the satellite Global Positioning System (GPS) commonly used today for timing and positioning measurements. GPS enables synchronization of device embodiment clocks down to the microsecond and nanosecond range or finer. Descriptions of GPS timing techniques and the accuracies obtainable are covered in "Tom Logsdon's "Understanding the Naystar: GPS, GIS, and IVHS"; $2^{nd}$ edition; 1995; Van Nostrand Reinhold; Ch. 11; pp. 158-174 which is hereby incorporated by reference.

Two-way transfer time synchronization methods may also be used, including techniques similar to those described in "Two-way Satellite Time Transfer"; published by the U.S. Naval Observatory which is hereby incorporated by reference.

Nevertheless, the present time-based invention is not limited to GPS for either the master clock means nor for the device embodiment synchronization means. Any reasonably accurate clock may serve as the master clock including, but not limited to atomic clocks, cesium, rubidium, hydrogen maser clocks, or even quartz clocks; also any satellite-based clock, for example, GPS, transit navigational satellites, GOES satellites; any wireless clock, for example LORAN, TV, WWVB radio, radio phone, local radio; any land-based clock using physical interconnections such as copper wire, cable, microwave, or fiber, such as the central office clocks used currently by the telecommunications providers for synchronizing their synchronous networks; or even sea-based clocks will work as a master clock for the purposes of the present invention.

In the same manner, any time synchronization techniques for synchronizing the device embodiments with a master clock and/or with each other may be used. This includes, but is not limited to: synchronization bits, synchronization packets, synchronization pulses, heartbeat packets, beacon packets, beacon frames, and/or any other packets or information segments which may be also be used for timing. The use of time synchronization techniques also includes, but is not limited to various methods and/or approaches such as absolute time synchronization, clock fly-overs, common-view mode, and multi-satellite common view mode; Network Transfer Protocol (NTP); two-way time transfer; and various other techniques in use today such as the telecommunications synchronous network system used in central offices and other higher level switching centers today.

Reservation Schedules—As the device embodiments are synchronized in the network, each device may initiate its own layer one, layer two, and/or higher layer event scheduling process. The reservation schedule process includes building a layer one, layer two, and/or higher layer event schedule for each input line and/or output line on each network element device embodiment, which thus enables the establishment of reservations for specific times, fixed times, non-fixed times, periodic (repeating) times, non-periodic repeating times, secret times, time intervals, random times, pseudo-random times, predetermined times, times based upon a seed value, secret information, key, encryption method, shared keys, and/or any other method. In this way, packets and/or information fragments may be scheduled to be transferred from specific input lines to specific output lines, either buffered or non-buffered, in each network element device embodiment.

Session Setup—At this point, a real-time source, a real-time destination, a midpoint device, a call/session server, and/or any other network element device embodiment can initiate a layer one, layer two, and/or higher layer call and/or session setup process for any purpose, such as a secure or stealth session. This process establishes a specific and/or periodic (repeating) time schedule in each of the synchronized layer one and/or time-based network device element embodiments along a specific path from the source through the synchronized network to the destination. At the scheduled time(s), each synchronized network element device node embodiment along that path switches their appropriate input and/or output lines to time-oriented switching, which may bypass and/or cut-through the normal packet buffering and switching mechanism. Time-based packets can then be routed (either buffered or non-buffered) from the input lines through a switch fabric and/or other switching mechanism, and on through the output lines to the next synchronized network element device node, which may be synchronized and scheduled to perform the same functions. In this manner, a packet may be sent using a cut-through and/or bypass method from the source through the network to the destination based on timing. Time based scheduling achieves the goal of transferring a packet and/or information segment through a data path in sequence using timing to switch/route the data.

VII. Network boundary aspects—Stealth packets with rule violations will be unable to penetrate standard routers/switches, as they will be discarded. Thus, at the network boundary between a secure stealth network and a non-stealth network, packets will be unable to proceed into the non-stealth network. With this approach, secure networks, which formerly had to be totally isolated from non-secure networks for security purposes, may now be attached to non-secure networks. Non-secure packets may flow freely in-and-out of the secure network, while secure "stealth" packets are unable to travel outside of the secure stealth network.

In a time-based network, non-violation packets may be read and transferred from the time-based network to the non-time based network based on header information.

In a combination time-based and packet-violation network, the packet-violations will prevent the packets from traveling outside of the stealth network boundary.

Process—One process by which the rule-violation system works is achieved in the following steps:
   Step 1—Assemble correct content information for transmission.
   Step 2—Establish and/or implement one or more abnormal, unexpected, unanticipated, non-standard, and/or other violations in one or more rules, formats, protocols, bit rates, encoding methods, synchronization methods, timing methods, and/or any other methods regarding one or more packets, frames, cells, information structures, and/or information fragment structures, which may result in errors, misapprehensions, confusion, discards, and/or any other inabilities to intercept, detect, comprehend, transfer, route, switch, and/or interpret said information correctly.
   Step 3—Transfer said information.
   Step 4 (optional)—Receive said information.
   Step 5a (optional)—Intentionally interpret and/or process said information correctly in spite of intentional violations.
   Step 5b (optional)—Act correctly upon said information.
   Alternative Step 5 (optional)—Unintentionally interpret and/or process said information incorrectly due to intentional violations.

Process—A process by which the time-based switching system works is achieved in the following steps:
   Step 1—One or more network elements synchronize their clocks to some acceptable tolerance, so that small variations are insignificant compared to the bit rate of the network elements and transmission systems.
   Step 2—Establish one or more time-based transfers for one or more information packets in one or more network elements. Time-based transfers may be based on one or more absolute times and/or one or more times referenced to some relative event time, including, but not limited to synchronization packets, synchronization pulses, heartbeat packets, beacon frames, and/or synchronization bits. Optionally, these times can vary provided they vary in synchrony. Optionally, secret times may be exchanged for this purpose.
   Step 3—Transfer one or more information packets between said one or more network elements in accordance with said one or more times. These information packets may or may not have rule violations.

FIG. 1 shows an illustrative exemplary packet, cell, frame and/or other information structure 27. This illustrative exemplary packet, cell, frame, and/or other information structure 27 comprises one or more optional illustrative exemplary fields and/or formats, such as currently exist in information and communication standards, as is well known to those skilled in the art. Optional illustrative exemplary fields may include, but are not limited to: optional exemplary illustrative preambles and/or leading flags 27a, which may be considered Layer 1 fields; optional illustrative exemplary layer 2 and/or data link layer frame and/or cell header fields 27b, e.g., 802.x, Ethernet, Token bus, Token ring, wireless, FDDI, LLC, and/or MAC headers; optional illustrative exemplary tag and/or label fields 27c, e.g., MPLS headers; optional illustrative exemplary layer 3 and/or network layer and/or packet header fields 27d, e.g., IP, X.25; optional illustrative exemplary layer 4 and/or transport layer information 27e, e.g., TCP, UDP, and/or GRE (Generic Route Encapsulation) headers; optional illustrative exemplary layer 5 and/or session layer information 27f, e.g., ISO 8327; optional exemplary illustrative layer 6 and/or presentation layer information 27g, e.g., ISO 8923; optional exemplary illustrative layer 7 and/or application layer information 27h, e.g., ISO X.400, X.500, SMTP, FTP, Telnet, SNMP; optional illustrative exemplary data content information and/or payload data 27i; optional illustrative exemplary error checking information 27j, e.g., cyclic redundancy checks (CRCs), forward error correction (FEC); and/or parity checks; and/or optional illustrative exemplary trailing flags and/or other trailing information 27k. These fields 27a-27k may be in the order shown or in any other order in the illustrative exemplary information packet, cell, frame, and/or other information structure 27.

Optional additional illustrative exemplary bits 27u may also be included in between fields as shown, and/or inside fields.

Information structures such as information structure 27 are generally standardized and may have generally accepted rules to which the information structures 27 adhere. These rules enable correct interpretation of the information structures when they are transferred, such that information inside the information structure can be readily understood by authorized and unauthorized transmitters and receivers. Encryption may or may not be used in one or more of the fields, or in any combination of the fields.

Figure 2:
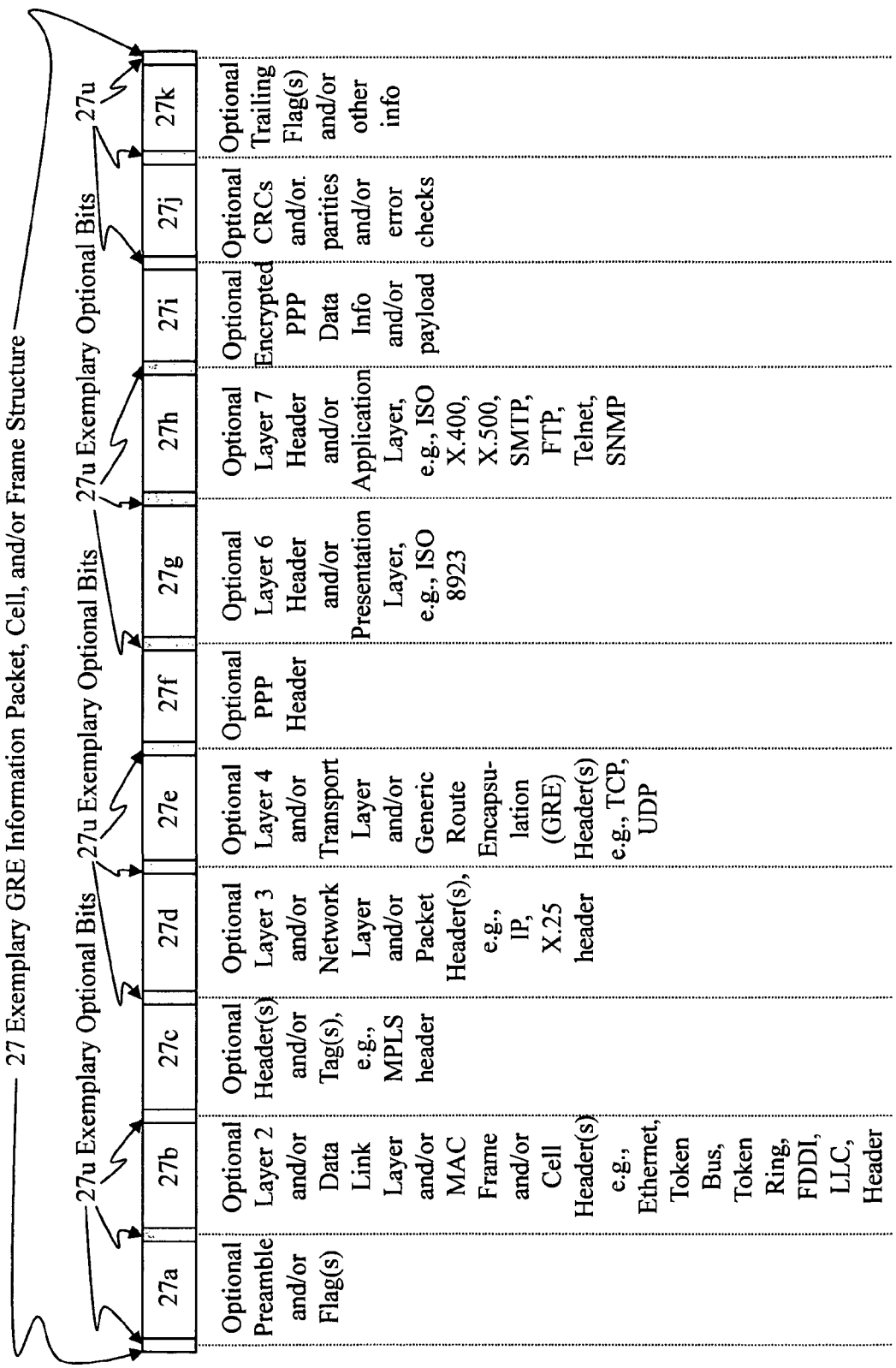
FIG. 2 shows an alternative illustrative exemplary information structure 27 with Generic Route Encapsulation (GRE).

FIG. 2 shows an illustrative exemplary information structure 27 for Generic Route Encapsulation (GRE), a Microsoft format for encapsulating data, as is known to those skilled in the art. This may comprise an optional exemplary GRE encapsulation field 27e, and/or an optional exemplary point-to-point protocol header field 27f.

Figure 3:
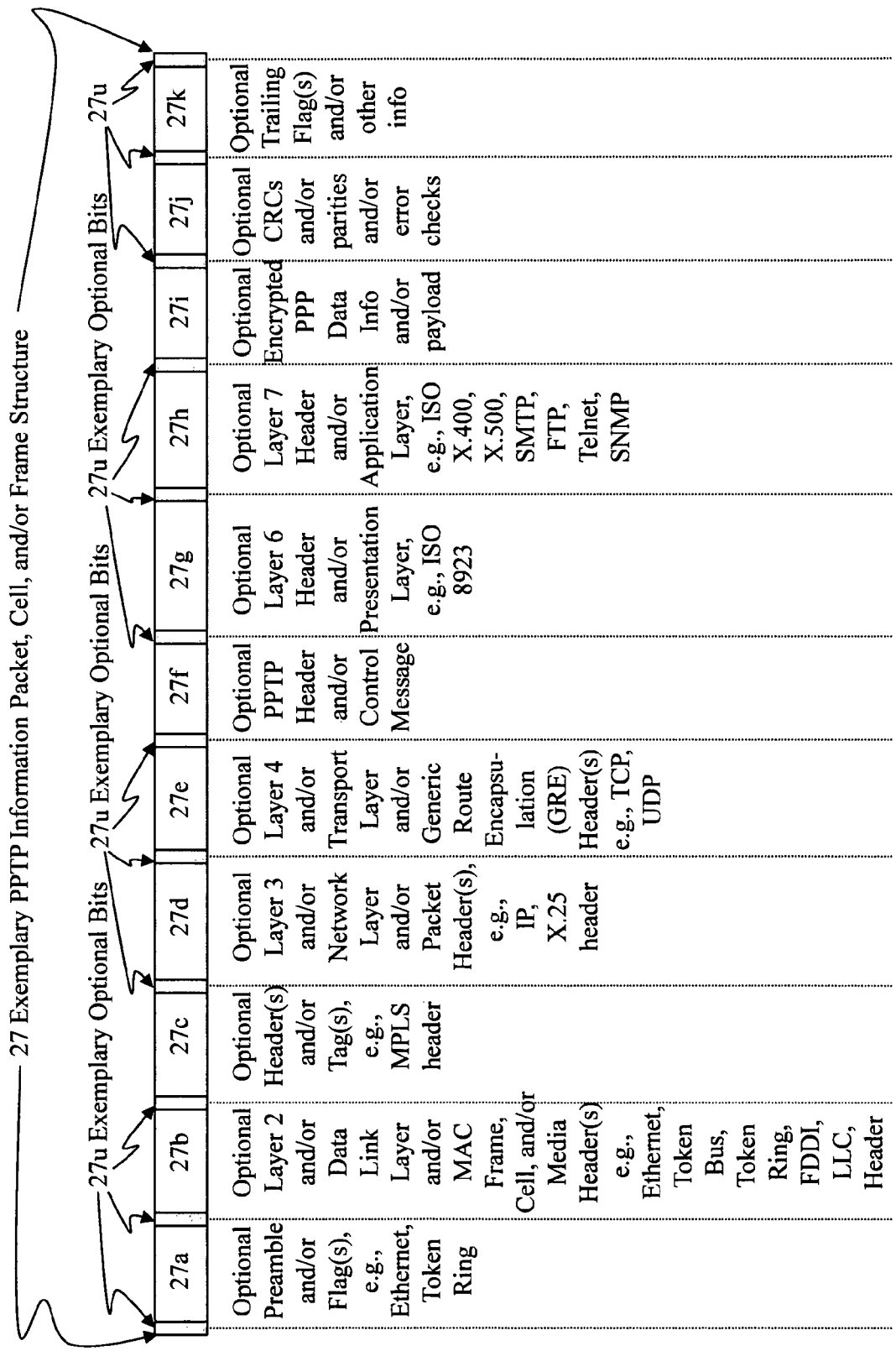
FIG. 3 shows an alternative illustrative exemplary point to point tunneling protocol (PPTP) control message information structure format 27.

FIG. 3 shows an illustrative exemplary point to point tunneling protocol (PPTP) control message information structure format 27, as is known to those skilled in the art. This may comprise an optional exemplary PPTP field 27f.

Figure 4:
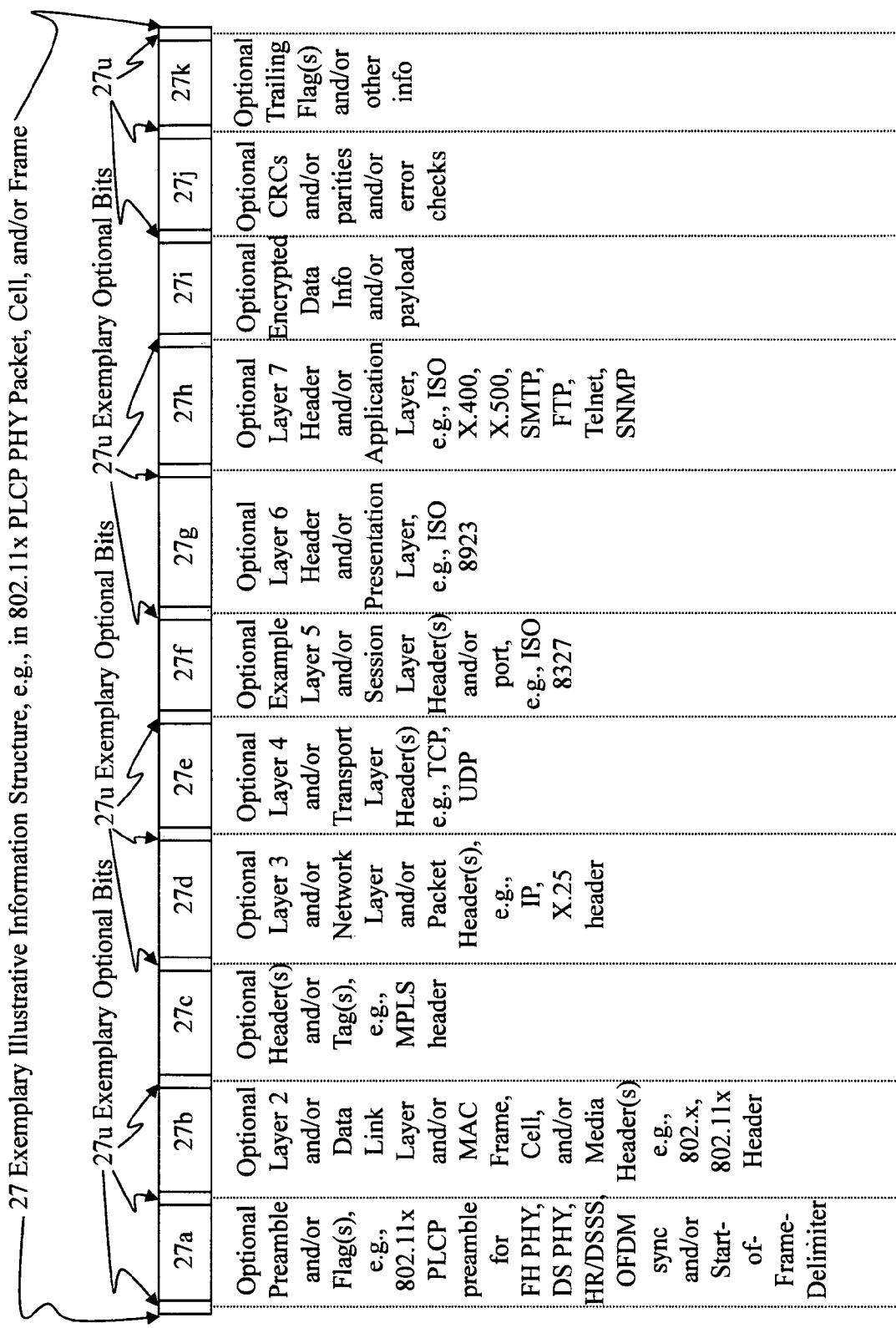
FIG. 4 shows an illustrative exemplary 802.11x (wireless) information structure format 27, including exemplary illustrative Physical Layer Convergence Procedure (PLCP) PHY (physical layer) information.

FIG. 4 shows an illustrative exemplary 802.11x information structure format 27, including exemplary illustrative Physical Layer Convergence Procedure (PLCP) PHY (physical layer) information, as is known to those skilled in the art. This may comprise an optional exemplary 802.11x preamble 27a for various 802.11x formats, including, but not limited to: Frequency Hopping (FH) PHYs; Direct Sequence (DS) PHYs; High Rate/Direct Sequence Spread Spectrum (HR/DSSS) PHYs; and/or Othogonal Frequency Division Multiplexing (OFDM) PHYs; which may incorporate synchronization bits and/or start-of-frame delimiters (SFD), scrambled and/or unscrambled, whitened and/or un-whitened, as is known to those skilled in the art. Preamble 27a contains various information and/or fields which may use rule violations to establish stealth packets.

FIG. 4 illustrates optional layer 2 and/or data link layer and/or MAC (Media Access Control) header. This header may include, but is not limited to various fields which may be used for rule violations to establish stealth packets, e.g., this includes, but is not limited to Frame Control fields, Duration fields, address fields; payload, and/or frame check sequence fields.

Figure 5A:
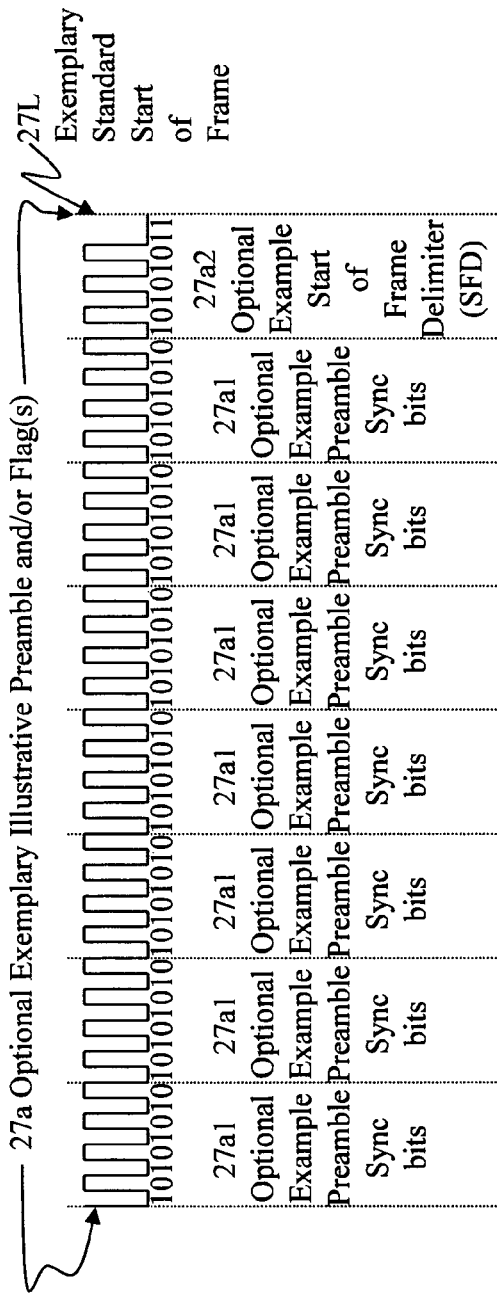
FIG. 5A shows an illustrative exemplary preamble and/or flag(s) 27a, which further comprises optional exemplary preamble synchronization bits 27a1, and optional exemplary Start-of-Frame Delimiter (SFD) 27a2.

FIG. 5A shows an illustrative exemplary preamble and/or flag(s) 27a, which further comprises optional exemplary preamble synchronization bits 27a1, and optional exemplary Start-of-Frame Delimiter (SFD) 27a2, which then indicates the exemplary standard Start-of-Frame 27L. FIG. 5A shows a standard approach as is known to those skilled in the art.

Figure 5B:
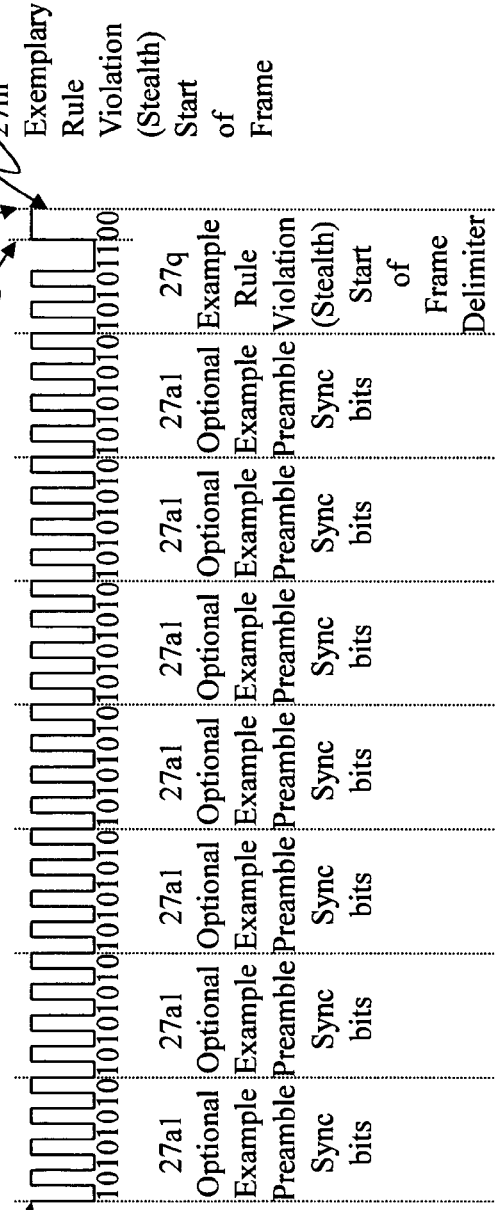
FIG. 5B illustrates an exemplary alternative stealth preamble and/or flag(s) 27a with undershot rule violations for the Start-of-Frame Delimiter.

FIG. 5B illustrates an exemplary alternative stealth preamble and/or flag(s) 27a with undershot rule violations for the Start-of-Frame Delimiter. FIG. 5B comprises optional illustrative exemplary preamble sync bits 27a1, followed by an exemplary rule violation (stealth) Start of Frame Delimiter 27q. Here, exemplary rule violation Start of Frame Delimiter 27q uses a 10101100 as the Start of Frame Delimiter, instead of using the standard 10101011 SFD 27a2 as shown in FIG. 5A. Thus, a standard receiving device which was listening for the Start of Frame Delimiter (SFD) 27a2 of 10101011 would be fooled into starting the frame at the exemplary Undershot False Start of Frame 27n (FIG. 5B), instead of at the correct exemplary rule violation (Stealth) Start of Frame 27m (FIG. 5B). By using a rule violation (stealth) Start of Frame Delimiter, authorized (stealth-enabled) devices would correctly interpret the Start of Frame 27m, and thus correctly interpret the remaining information in the packet, frame, and/or cell. Unauthorized devices, however, would incorrectly interpret the Start of Frame two bits early at the False Start of Frame 27n, and thus incorrectly interpret the remaining information in the packet, frame, and/or cell.

In practice, the number of bits in the total information packet would be invalid causing the packet, cell, and/or frame to be discarded. Further, error checking would likely signal errors which would also cause discard. Addressing in all the layers would also likely be inaccurate, so the information could not route correctly, etc. Clearly, Start of Frame rule violations would cause packet loss and/or low probability of detection (LPD) and/or Low Probability of Intercept (LPI) in non-authorized equipment. Authorized equipment, on the other hand, would be able to clearly detect the violation and interpret and process the information correctly.

Figure 6A:
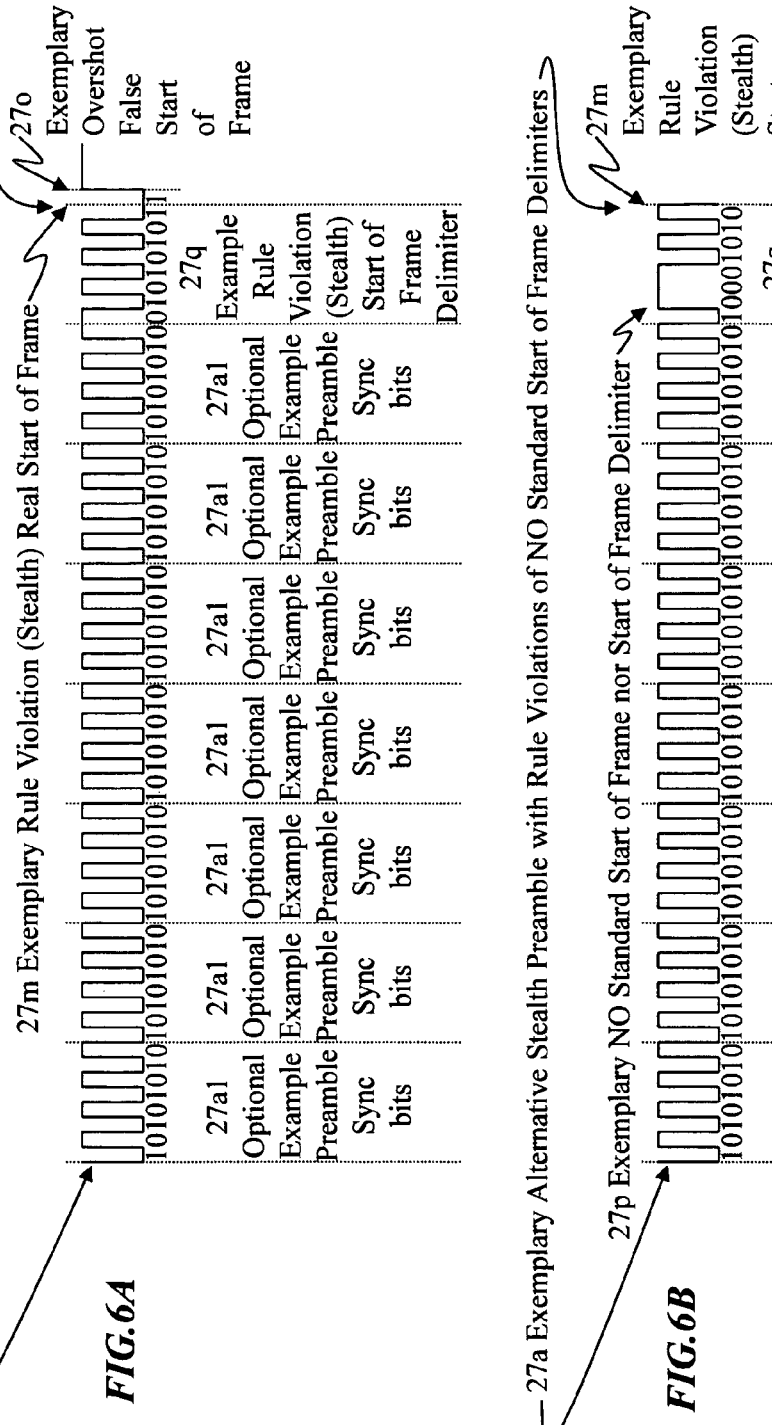
FIG. 6A illustrates an exemplary alternative stealth preamble and/or flag(s) 27a with alternative Start-of-Frame Delimiter rule violations and/or overshot rule violations for the Start-of-Frame Delimiter.

FIG. 6A illustrates an exemplary alternative stealth preamble and/or flag(s) 27a with overshot rule violations for the Start-of-Frame Delimiter. FIG. 6A comprises optional illustrative exemplary preamble sync bits 27a1, followed by an exemplary rule violation (stealth) Start of Frame Delimiter 27q. Here, an exemplary rule violation Start of Frame Delimiter 27q uses a 01010101 octet instead of the standard 10101011 SFD. Normal standardized and/or non-stealth-enabled equipment should become confused by the two 00s which occur as the last bit in the last Sync bit octet 27a1 and the first bit of the rule violation SFD 27q. This likely will cause the standardized and/or non-stealth-enabled receiving equipment to detect an error and throw the stealth packet away, while it resumes listening for sync bits and or sync bit streams 27a1 for the next standardized packet. Stealth-enabled receiving equipment, however, may be programmed to interpret exemplary rule violation SFD 27q as a valid SFD and interpret the rule violation packet as it is intended to be interpreted.

FIG. 6A alternatively illustrates another exemplary alternative stealth preamble with an overshot rule violation for the Start of Frame Delimiter 27a. In this example, rule violation SFD 27q illustratively has used its final 1 bit inserted a false 1 bit for the next bit such that the 11 that normally signals the end of the SFD occurs 1 bit too late. This means that all of the bits in the stealth packet 27 will be interpreted by standardized non-stealth equipment to be a single bit off, as they will start the frame at exemplary overshot false start of frame 27o. Thus the packet will be interpreted totally incorrectly by standardized non-stealth-enabled equipment. Further, the length of the packet will be 1 bit off (non-standard) causing the packet to be thrown away. Still further, the 1 bit error will likely cause the CRC and/or other error-detection functions to interpret the packet as having bit errors and will likely discard the packet.

Figure 6B:
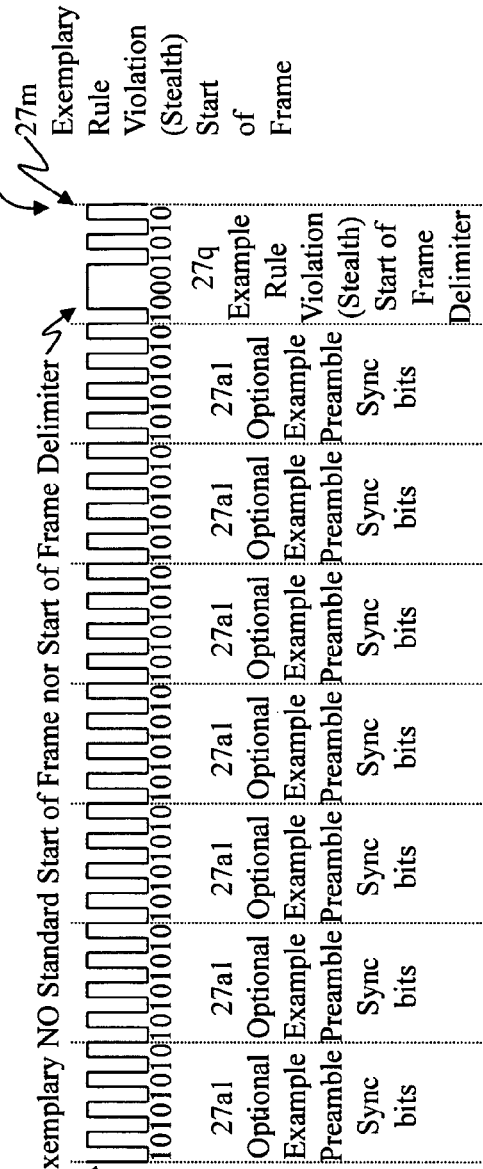
FIG. 6B illustrates an exemplary alternative stealth preamble and/or flag(s) 27a with exemplary rule violation of NO standard Start-of-Frame Delimiter 27p as shown by NO sequence of consecutive 11 bits to indicate the Start-of-Frame Delimiter 27p.

FIG. 6B illustrates an exemplary alternative stealth preamble and/or flag(s) 27a with exemplary rule violation of NO sequence of consecutive 11 bits to indicate the standard Start-of-Frame Delimiter as shown by 27p. FIG. 6B comprises optional illustrative exemplary preamble sync bits 27a1, followed by an exemplary rule violation (stealth) Start of Frame Delimiter 27q. However, exemplary rule violation Start of Frame Delimiter 27q uses a 10001010 octet instead of the standard 10101011 SFD. Normal standardized and/or non-stealth-enabled equipment should become confused by the three 000s at the end of the exemplary sync bits 27a1 since there is never any valid start of frame. Standard equipment may discard the packet because there is no standard SFD, or it may interpret the first occurrence of a 11 bit sequence as the SFD, thus incorrectly interpreting all of the following bits. This likely will cause the standardized and/or non-stealth-enabled receiving equipment to detect an error and throw the stealth packet away, while it resumes listening for sync bits and or sync bit streams 27a1 for the next standardized packet. Stealth-enabled receiving equipment, however, may be programmed to interpret exemplary rule violation SFD 27q as a valid SFD and interpret the remaining rule violation packet as it is intended to be interpreted.

Figure 7:
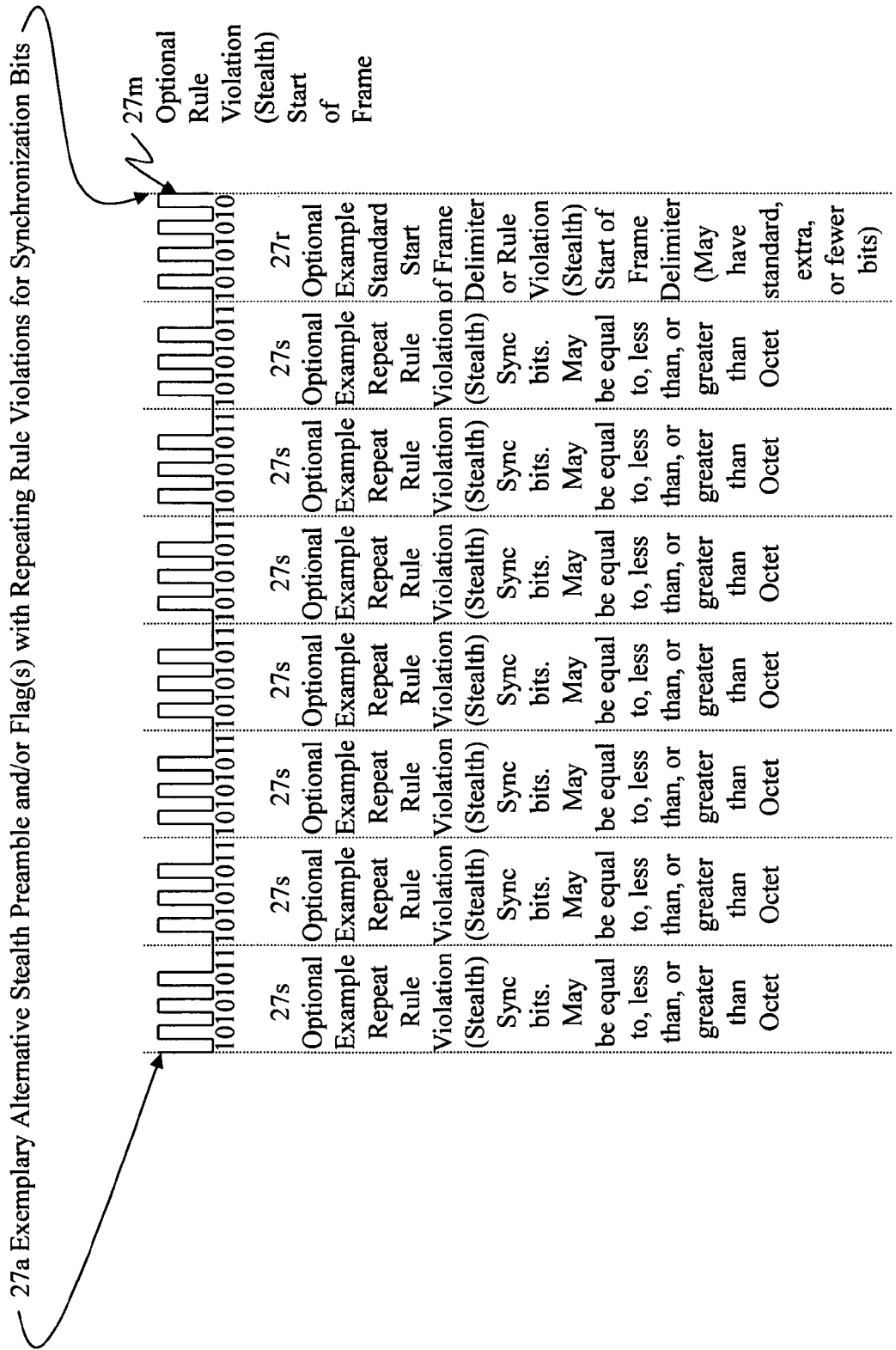
FIG. 7 shows an exemplary alternative stealth preamble and/or flag(s) with repeating rule violations for synchronization bits 27a, as illustrated by optional rule violations of repeating synchronization bits 27s, and/or rule violations of start-of-frame delimiter 27r.

FIG. 7 shows an exemplary alternative stealth preamble and/or flag(s) with repeating rule violations for synchronization bits 27*a*. In this case, the optional exemplary synchronization bits 27*s* have a non-standard, but repeating bit pattern which the stealth-enabled equipment may correctly interpret and synchronize with. The number of bits in the repeating pattern may be equal to, less than, or greater than the standard octet. Thus, the repeating bit pattern 27*s* may be a repetitive 6 bits, 9 bits, and/or any other repeating bit pattern. This repeating synchronization pattern may be followed by an exemplary standard SFD 27*r*, or by a non-standard rule-violation SFD 27*r*. Further, the SFD 27*r* may have fewer than, equal to, or more than 8 bits as its distinctive pattern. Thus, stealth-enabled equipment would know to start the frame at the correct start of frame position 27*m*, whereas non-stealth-enabled equipment would not know where to correctly start the frame.

FIG. 8 shows an exemplary alternative stealth preamble and/or flag(s) with non-repeating rule violations for synchronization bits 27*a*. In this case, the optional exemplary synchronization bits 27*t* have a non-standard, non-repeating bit pattern which the stealth-enabled equipment may correctly interpret and synchronize with. The number of bits in the non-repeating pattern may or may not be divisible into octets. Further, the stealth-enabled synchronization mechanism may be programmable to be able to synchronize on some of the last bits in the pattern in case some of the preceding bits are lost. This non-repeating synchronization pattern may be followed by an exemplary standard SFD 27*r*, or by a non-standard rule-violation SFD 27*r*. Further, the SFD 27*r* may have fewer than, equal to, or more than 8 bits as its distinctive pattern. Thus, stealth-enabled equipment would know to start the frame at the correct start of frame position 27*m*, whereas non-stealth-enabled equipment would not know where to correctly start the frame.

Figure 9:
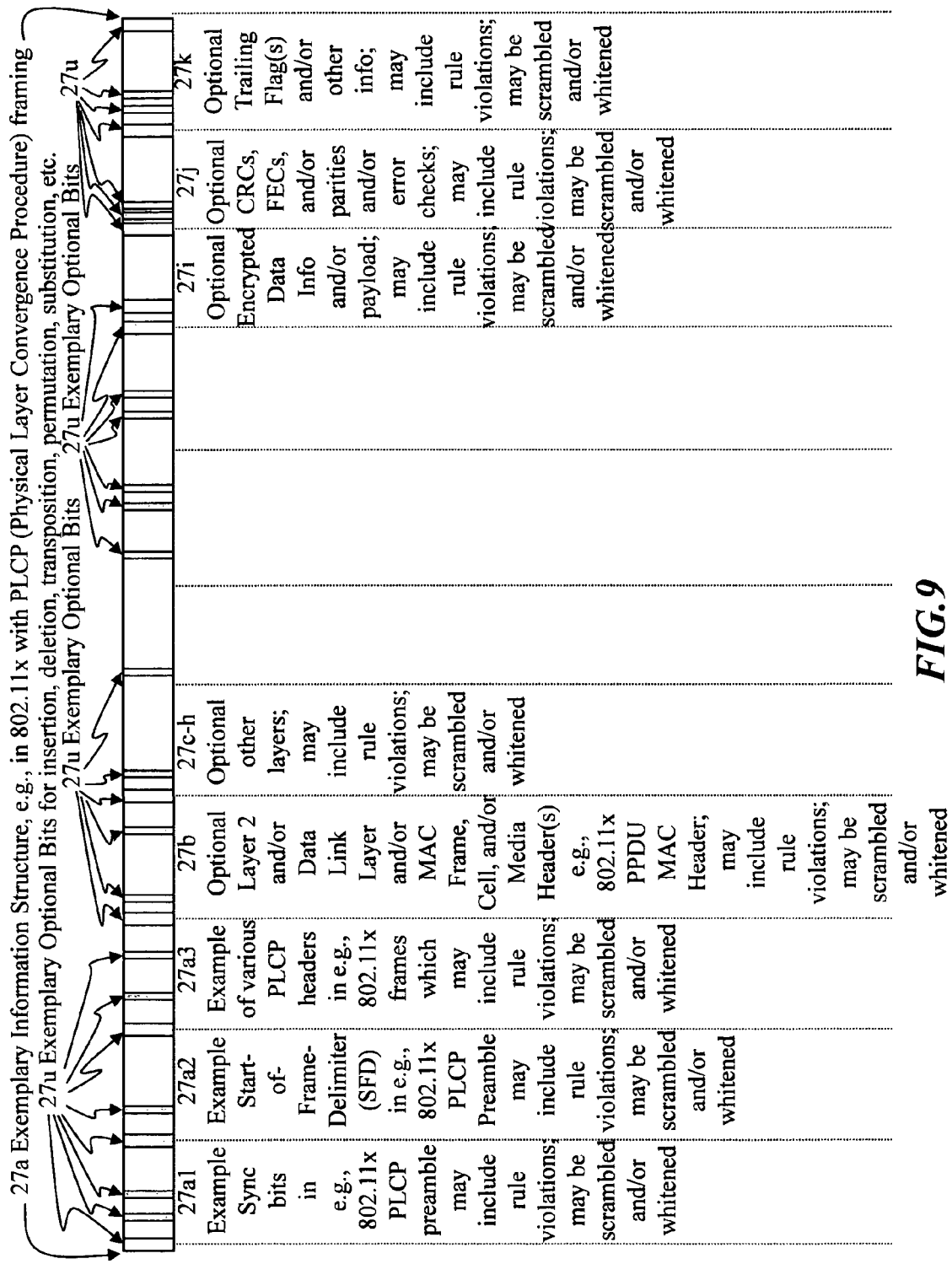
FIG. 9 illustrates an exemplary information structure such as any 802 packet, frame, and/or cell, such as an 802.11 wireless packet with a PLCP (Physical Layer Convergence Procedure) frame 27a, which may optionally include rule violations in any field, including added bits, subtracted bits, transferred bits, transformed bits, substituted bits, altered bits, etc., and which may be scrambled, whitened, and/or encrypted.

FIG. 9 illustrates other alternative methods of achieving stealth and/or rule violation results which include, but are not limited to:

Inserting one or more false bits at any one or more predetermined points in any information structure and/or packet 27, 27*a*, from anywhere in the packet/information structure to anywhere else in the packet/information structure 27, 27*a*, either normally or inverted (not just limited to the preamble, e.g., some transmission methods don't require preambles); and/or deleting one or more bits at any one or more pre-established points in the packet/information structure 27, 27*a* (not just limited to the preamble); and/or creating any other transpositions, permutations, scrambling, intermixing, intermingling, and/or substitutions by rearranging any one or more bits at any one or more points anywhere in the packet 27, 27*a* (not just limited to the preamble).

The above-mentioned inserting, deleting, transposing, permutating, inverting, scrambling, and/or substituting can yield over a googol (10 to the $100^{th}$ power) encryption complexity density. This approach may be performed in a fixed manner, in a programmed manner, and/or may dynamically change over time using various cryptographic methods and/or keys as is well known to those skilled in the art. This includes, but is not limited to methods and/or techniques using elements such as: public-key systems, digital signatures, addressing keys (e.g., MAC, or IP addresses, etc.), geographic position and/or location, time, entropy, perfect secrecy, codes, ciphers, encryption algorithms, product ciphers, polygram ciphers, exponentiation ciphers, knapsack ciphers, Data Encryptions Standard (DES), 3DES, AES, RSA, IPSEC, VPN, LEAP, EAP, RC4, RADIUS, WEP, SSL, block and stream ciphers, synchronous stream ciphers, self-synchronous ciphers, and/or any other encryption and/or secure methods and techniques, which are well known to those skilled in the art.

Combining stealth packet's complexity of over a googol (10 to the $100^{th}$ power) with standard encryption adds hundreds of orders of magnitude to decryption complexity.

In this manner, non-stealth-enabled equipment may be unable to determine that the information is even a packet, and if so, the equipment is unable to correctly interpret it. However, stealth-enabled equipment is able to interpret, process, and/or act upon the information correctly. Stealth-enabled equipment may also be multi-functional and able to interpret and act upon standardized packets as well, and may also be able to interpret and act upon multiple types of stealth rule violations.

FIG. 9 uses exemplary information structure 27*a* to illustrate any information structure such as any packet, frame, and/or cell. In this case, the packet is exemplified as any 802.11x or 802.16x (i.e., any 802 and/or 802 wireless packet, such as 802.11a, 802.11b, 802.11g, 802.16, etc.), with the example shown signifying various PLCP (Physical Layer Convergence Procedure) fields as part of information structure 27*a*. These PLCP fields may be any fields of various exemplary PLCP and/or PDM (Physical Media Dependent) types, including, but not limited to Frequency Hopping (FH) PHY (physical layer) fields, Direct Sequence (DS) PHY fields, High Rate/Direct Sequence Spread Spectrum (HR/DSSS) PHY fields. They may use any of various techniques, including, but not limited to: encoding, modulation, spreading mechanisms, Frequency Hopping, Spread Spectrum, Direct Sequence, GFSK, spreading, correlation, pseudo-random noise codes, barker sequences, chipping sequences, OFDM, scrambling, whitening, etc., as are known to those skilled in the art.

In FIG. 9, field 27*a*1 illustrates exemplary synchronization bits in an 802.11 PLCP preamble, which may include any rule violations and may be scrambled, whitened, and/or encrypted. Rule violations would cause errors, faults, and/or misinterpretations of data. Likewise, field 27*a*2 exemplifies the start-of-frame delimiter (SFD) in, for example, an 802.11 PCLP preamble, which also may include rule violations and may be scrambled, whitened, and/or encrypted. Field 27*a*3 exemplifies various PLCP headers in various formats of 802.11 frames, which may include rule violations and may be scrambled, whitened, and/or encrypted as well. Field 27*b* exemplifies an optional layer 2 and/or data link layer and/or MAC layer for an exemplary 802.11 PPDU (PLCP Protocol Data Unit), which may include rule violations and may be scrambled, whitened, and/or encrypted. Fields 27*c* through 27*h* illustrate other header layers which may include rule violations and may be scrambled, whitened, and/or encrypted. Field 27*i* exemplifies optional data info and/or payload, which may include rule violations and may be scrambled, whitened, and/or encrypted. Field 27*j* exemplifies optional CRCs. FECs (Forward Error Correction), and/or other error checking or correcting, which may include rule violations and may be scrambled, whitened, and/or encrypted. Field 27*k* exemplifies optional trailing flags and/or post-ambles, which may include rule violations and may be scrambled, whitened, and/or encrypted.

Further, exemplary optional bits 27*u* may comprise one or more bits which may be inserted, deleted, transposed, permutated, shifted, scrambled, transformed, and/or substituted at any point in the information structure 27*a* for the purposes of violating the standard information structure and/or causing the information in the packet to be extremely difficult to correctly interpret and/or decrypt. Inserting, deleting, transposing, shifting, permutating, scrambling, and/or substituting one or more bits at an entire packet structure level can totally distort the meaning and/or interpretation of the entire packet structure itself, as opposed to the current approach of just encrypting data in the packet. Inserting one or more garbage bits and/or deleting one or more non-necessary bits may result in shortened or lengthened bytes, such that the information structure and/or packet structure itself no longer divides evenly into octets. This adds a whole new dimension of encrypting/decrypting at the packet structure level versus the existing block encryption approaches and/or stream encryption approaches.

Thus, encryption techniques focused on encrypting the packet/information structure itself (either partly or entirely), as opposed to merely encrypting data in the packet as other current encryption techniques do, adds a totally new level of encryption/decryption complexity. As a result, encryption focused on the packet structure itself, coupled with existing encryption methods focused on data-level encryption, results in packet encryption which may be many orders of magnitude more difficult to correctly detect, intercept, decrypt, and/or otherwise interpret.

The authorized receiver of the stealth packet must be aware of which bits have been modified in order to correctly deconstruct the stealth packet into a correctly interpretable packet.

Alternatively, one or more bits (such as 27u or any other one or more bits in the information structure) may be encoded and transmitted in an alternative, non-standard coding scheme, either in-band and/or out-of-band, including, but not limited to, ultra wide band (UWB), wavelets; TDMA at some other frequency(ies) and/or wavelength(s); spread spectrum at some other frequency(ies) and/or wavelength(s); wavelength-hopping for optical wave-division multiplexing (WDM), dense wave division multiplexing (DWDM), etc. wherein one or more bits may shift to another wavelength in a wavelength-hopping and/or wavelength spread spectrum manner; and/or some other approach, either at the same time, or at an alternative time to the normal packet.

Figure 10:
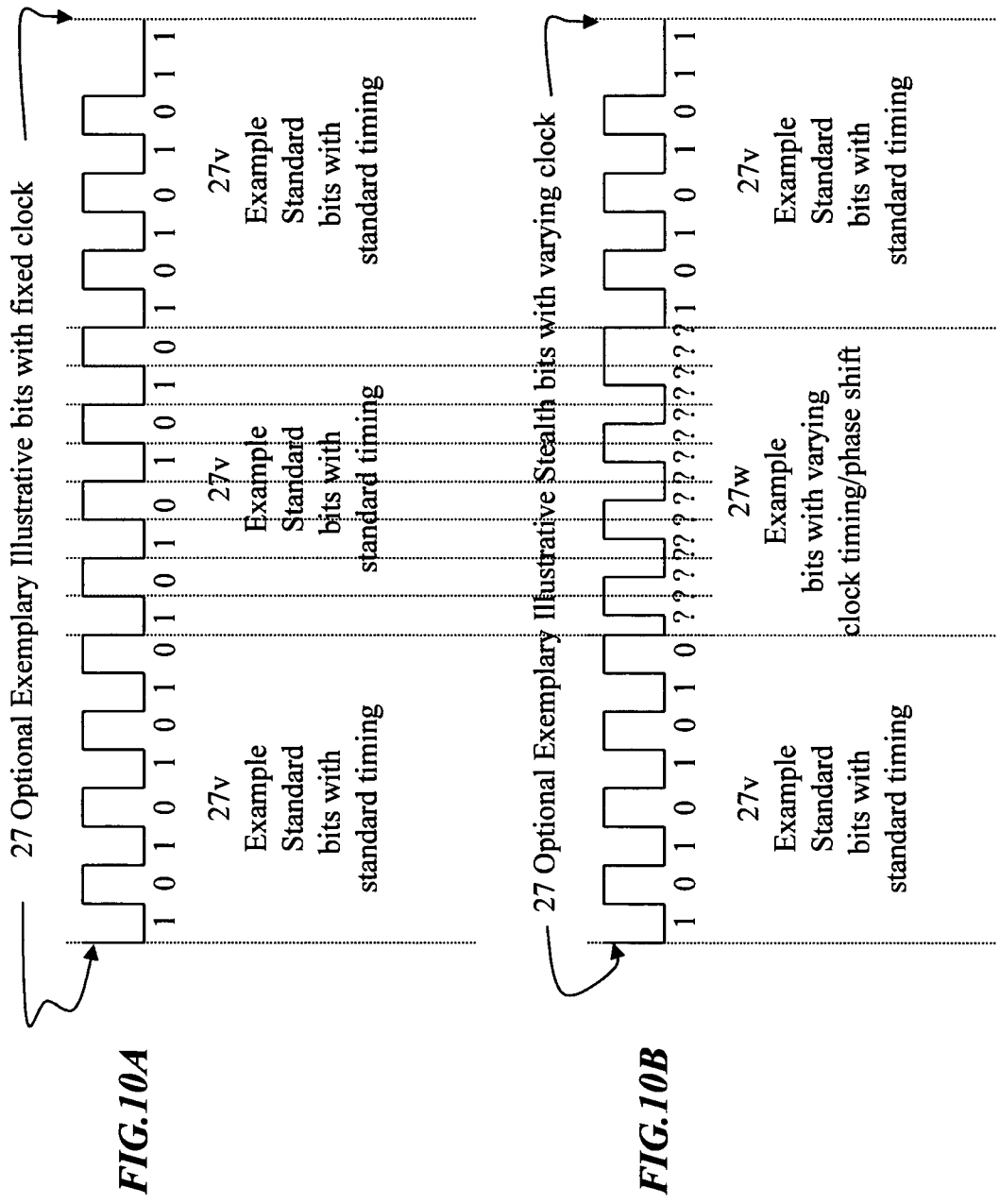
FIG. 10A illustrates exemplary illustrative bits with a relatively fixed clock rate 27v in information structure 27.
FIG. 10B illustrates the same bits with a varying clock 27, such that timing shift variations result in non-interpretable bits 27w.

FIG. 10A illustrates exemplary illustrative bits with a relatively fixed clock rate in information structure 27. Exemplary standard bits with standard timing 27v are shown with a relatively fixed clock rate.

FIG. 10B illustrates the same bits with a varying clock 27. When the clock rate is purposely varied gradually or suddenly in a predetermined manner as in 27w, the standardized receiver must try to interpret bits by sampling the bits during the transition period between bits, such that erratic, unpredictable results occur. By knowing the clock variations of the transmitter in advance, the stealth-enabled receiver can sample the bit stream correctly for 27w by shifting its clock in accordance with the transmitter clock. The clock phase may be shifted by 90 degrees (as shown), or by any phase shift (not shown). This phase shift may occur virtually instantaneously (as shown) and/or by varying both clocks gradually in synchronization with each other.

Figure 11:
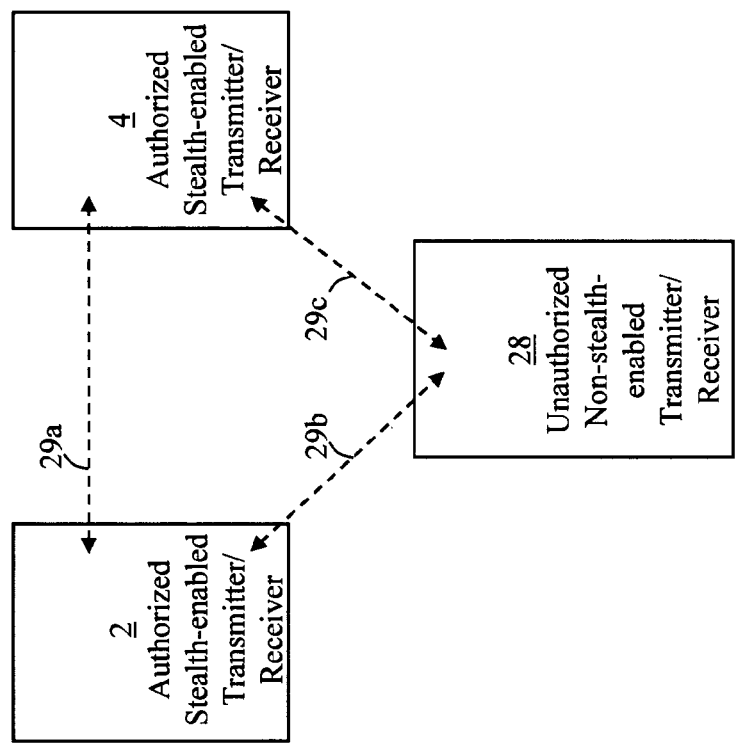
FIG. 11 illustrates point-to-point connections, either wireless, wired, and/or optical situations involving authorized stealth-enabled transmitter/receiver 2, authorized stealth-enabled transmitter/receiver 4, and unauthorized transmitter/receiver 28, with wireless, wired, and/or optical communications and/or communications paths 29a, 29b, and 29c.

FIG. 11 illustrates point-to-point connections, either wireless, wired, and/or optical situations involving authorized stealth-enabled transmitter/receiver 2, authorized stealth-enabled transmitter/receiver 4, and unauthorized non-stealth-enabled transmitter/receiver 28, with wireless, wired, and/or optical communications and/or communications paths 29a, 29b, and 29c. In a wireless situation, communications and/or communications paths 29a, 29b, and 29c might be a standard CSMA/CA protocol, 802.11, 802.16, and/or some other standard wireless protocol. In a wired and/or optical situation, the communication might be Ethernet or another protocol either over a shared media or a non-shared media using a protocol such as CSMA/CD, etc. In a shared media situation, the units might follow a standard CSMA/CA or CSMA/CD procedure by listening to the media, not transmitting when others are transmitting, listening for collisions, backing off and retransmitting if collisions are detected, etc. as is well known to those skilled in the art.

When authorized transmitter/receiver 2 sends a standard packet to authorized transmitter/receiver 4, unauthorized transmitter/receiver 28 may intercept the message. Unauthorized transmitter/receiver 28 may decrypt the message using available decryption tools if the message is encrypted. Unauthorized transmitter/receiver 28 may then try to sabotage the authorized parties by various methods known to those skilled in the art, such as staging "man-in-the-middle" attacks, pretending to be an authorized user, listening in on private communications, trying to penetrate the networks clandestinely, and other non-authorized actions as are well known to those skilled in the art.

However, if authorized transmitter/receiver 2 and authorized transmitter/receiver 4 both switch to stealth-mode and use mutually understood rule-violations for stealth packet information structures, protocols, timing variations, synchronization, etc., then units 2 and 4 can correctly interpret the information, whereas unauthorized transmitter/receiver 28 receives only non-standard, invalid, non-processable packets from units 2 and 4. To unauthorized transmitter/receiver 28, these invalid packets are discarded as noise, invalid packets, nonsensical information, and/or non-analyzable packets.

Figure 12:
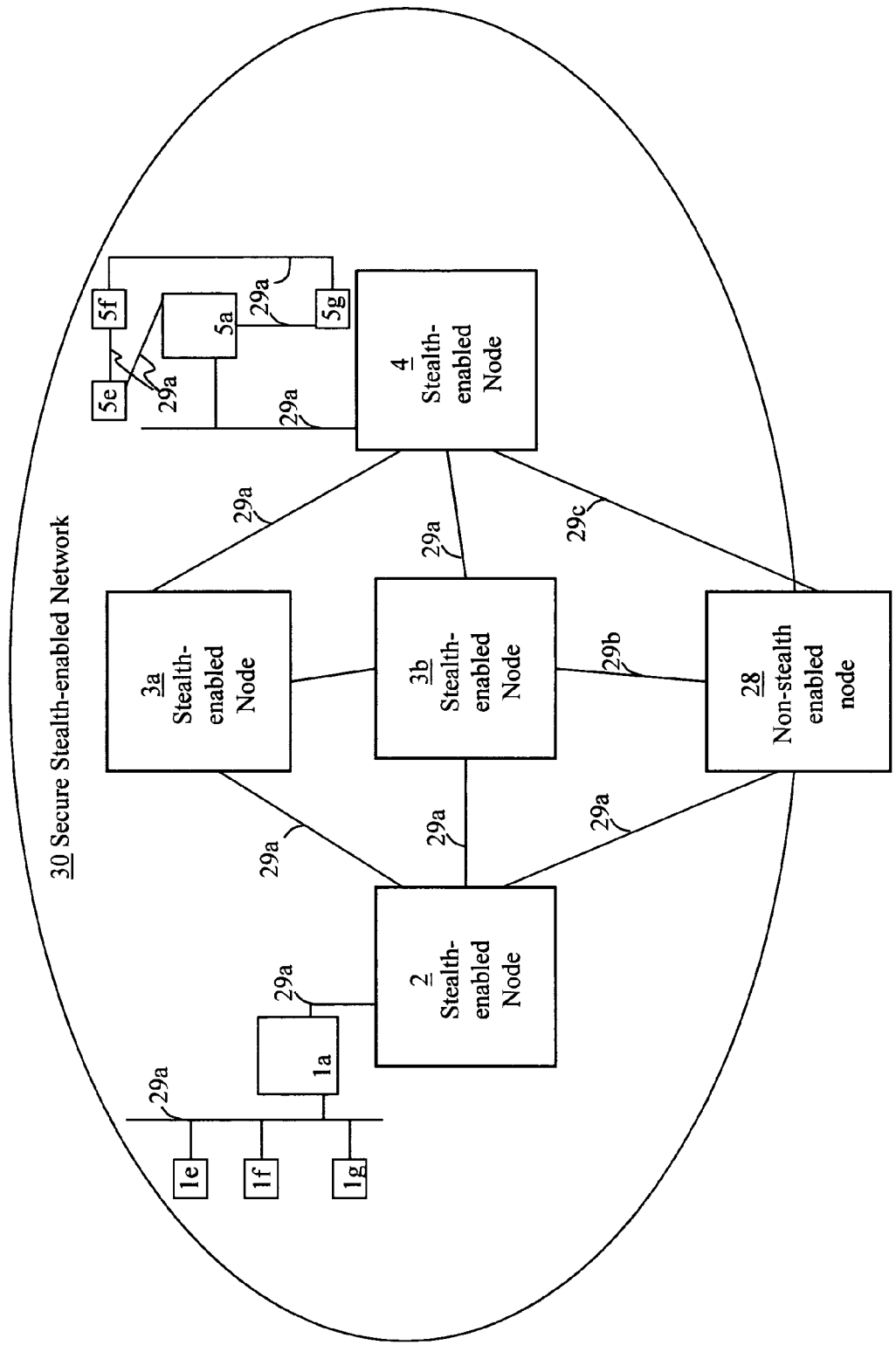
FIG. 12 illustrates any of various secure stealth-enabled networks 30 which may be wired and/or wireless in various combinations, and may be connected to and/or interoperable with non-stealth-enabled nodes 28 either inside of, outside of, and/or adjacent to secure stealth-enabled network 30.

FIG. 12 illustrates a secure stealth-enabled network 30 which may be wired and/or wireless in various combinations. Secure stealth-enabled network 30 comprises stealth-enabled node 2; stealth-enabled node 3a; stealth-enabled node 3b; stealth-enabled node 4; a stealth-enabled Local Area Network (LAN) comprised of stealth-enabled LAN nodes 1a, 1e, 1f, and 1g; and/or a stealth-enabled token network comprised of stealth-enabled token nodes 5a, 5e, 5f, and 5g. Non-stealth-enabled node 28 may be located either inside of, outside of, and/or adjacent to secure stealth-enabled network 30. Non-stealth-enabled node 28 may be connected to any nodes within secure stealth-enabled network 30 either with wireless and/or wired connections.

In FIG. 12, standardized packets and/or other non-stealth information structures may be sent from any nodes (stealth-enabled nodes 1a, 1e, 1f, 1g, 2, 3a, 3b, 4, 5a, 5e, 5f, and/or 5g; and/or non-stealth-enabled nodes 28) to any other nodes (stealth-enabled nodes 1a, 1e, 1f, 1g, 2, 3a, 3b, 4, 5a, 5e, 5f, and/or 5g; and/or non-stealth-enabled nodes 28), and may be routed/switched through any other nodes (stealth-enabled nodes 1a, 1e, 1f, 1g, 2, 3a, 3b, 4, 5a, 5e, 5f, and/or 5g; and/or non-stealth-enabled nodes 28).

However, in FIG. 12, non-standardized information structures (i.e., secure and/or stealth packets) may only be transferred from stealth-enabled nodes 1a, 1e, 1f, 1g, 2, 3a, 3b, 4, 5a, 5e, 5f, and/or 5g—directly to other stealth-enabled nodes 1a, 1e, 1f, 1g, 2, 3a, 3b, 4, 5a, 5e, 5f, and/or 5g—or through other stealth-enabled nodes 1a, 1e, 1f, 1g, 2, 3a, 3b, 4, 5a, 5e, 5f, and/or 5g. Stealth-enabled equipment would receive the stealth packet and know that it is a stealth packet according to a different set of rules, thus being able to interpret it and/or transfer it correctly. Attempted transfers from stealth-enabled nodes 1a, 1e, 1f, 1g, 2, 3a, 3b, 4, 5a, 5e, 5f, and/or 5g—to non-stealth enabled nodes 28 (either inside of, outside of, or adjacent to a secure stealth-enabled network 30)—will not be interpretable by nor correctly transferable by a non-stealth-enabled node 28. Thus, stealth-enabled information structures will not be able to exit the secure stealth-enabled network 30, either wireless and/or wired.

Wired and/or wireless stealth-enabled packets would be visible only to other stealth-enabled systems, and the stealth packets would be invisible to (or discarded by) non-stealth-enabled receivers, systems, snoopers, sniffers, etc. Further, multiple stealth-enabled networks 30 could co-exist simultaneously in the same space, as each stealth-enabled network 30 could have its own set of rules and/or rule violations which the nodes in its network uniquely understand.

Various routing protocols may be adapted for stealth use which establish one or more paths through stealth-enabled nodes and/or networks, as is well known to those skilled in the art, e.g., RSVP (Resource Reservation Protocol), SIP (Session Initiation Protocol), etc.

Figure 13:
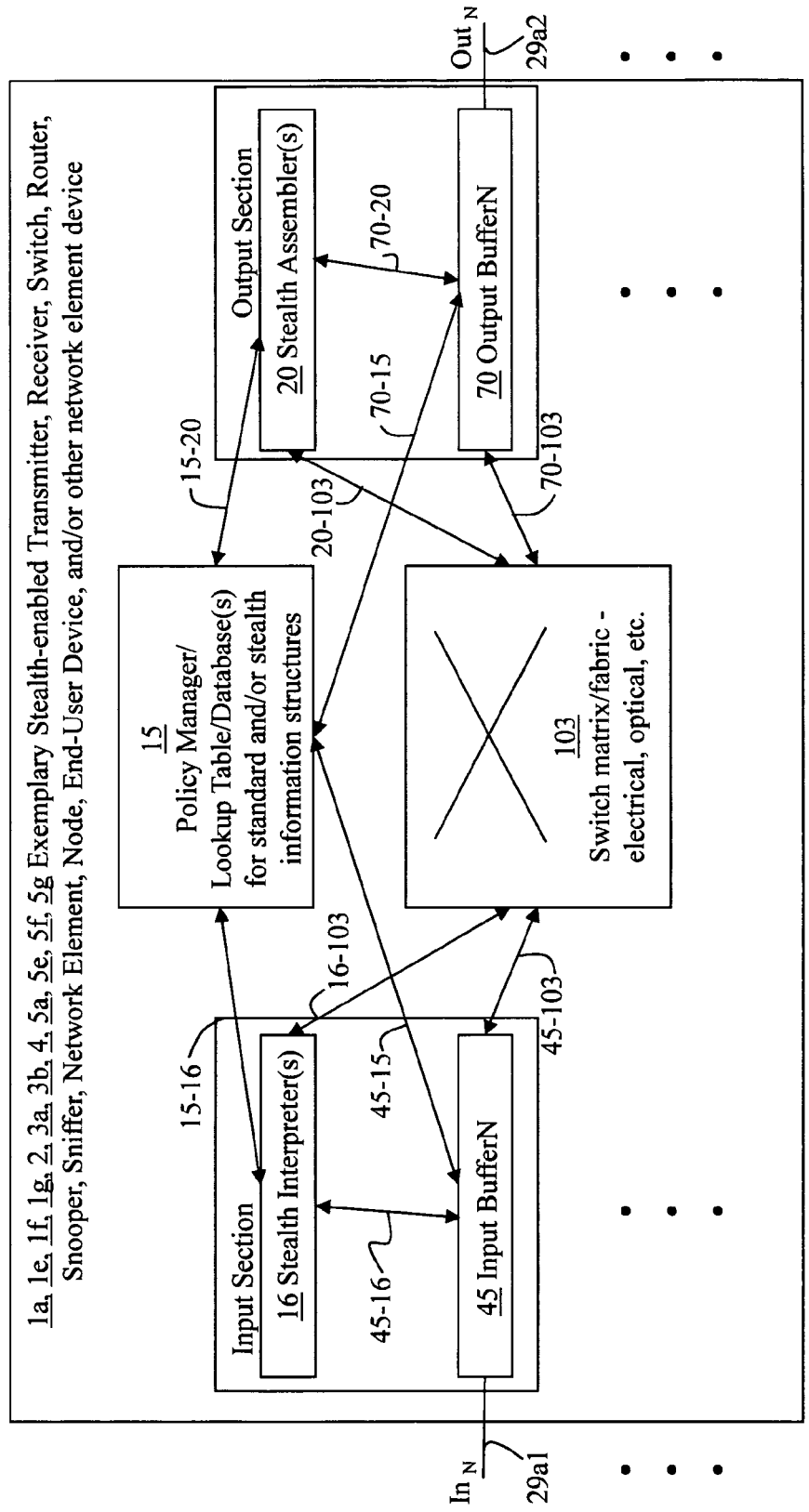
FIG. 13 illustrates exemplary internal elements and processes for an exemplary stealth-enabled transmitter, receiver, switch, router, snooper, sniffer, network element, node, end-user device and/or other network element device(s) 1a, 1e, 1f, 1g, 2, 3a, 3b, 4, 5a, 5e, 5f, and/or 5g.

FIG. 13 illustrates exemplary internal elements and processes for an exemplary stealth-enabled transmitter, receiver, switch, router, snooper, sniffer, network element, node, end-user device and/or other network element device(s) 1a, 1e, 1f, 1g, 2, 3a, 3b, 4, 5a, 5e, 5f, and/or 5g. These network element devices comprise one or more input sections for receiving stealth packets comprising optional input buffers$_N$ 45 for receiving standard and/or stealth information structures; one or more optional stealth interpreters and/or translators 16 which may be used to interpret a received stealth information structure; one or more switch matrix/fabrics 103 for switching standard and/or stealth information structures from wireless, wired, and/or optical communications or communications path inputs In$_N$ 29a1 to wireless, wired, and/or optical communications or communications path outputs Out$_N$ 29a2; one or more (optionally programmable) policy managers/lookup tables/databases 15 for managing standard and/or stealth information structure lookup for switching, routing, prioritization, stealth construction/deconstruction information, and/or other information lookup purposes; one or more stealth assemblers and/or translators 20 which may be used to assemble, interpret, translate, transform, construct, and/or modify stealth information structures; and/or one or more output sections for transferring stealth packets, comprising optional output buffers$_N$ 70 for storing and/or transmitting standard and/or stealth information structures.

In FIG. 13, a standard and/or stealth information structure is received by input buffer$_N$ 45 through wireless, wired, and/or optical communications or communications path inputs In$_N$ 29a1. Standard and/or stealth information structures may be looked up directly through path 45-15 without using stealth interpreter 16 in one or more lookup tables/databases 15 to determine switching, routing, prioritization, stealth information, and/or other processing information, which the device(s) 1a, 1e, 1f, 1g, 2, 3a, 3b, 4, 5a, 5e, 5f, and/or 5g may act upon. These actions may include using the information internally, externally, modifying the information in some way, and/or transferring the standard and/or stealth information structures directly over path 45-103 to electrical, optical, and/or other switching matrix/fabric 103. Note that input buffer$_N$ 45 may store multiple packets and/or information structures of various types (packets, cells, frames, etc.; stealth and/or non-stealth) and in multiple queues.

Alternatively, stealth information structures may be transferred over path 45-16 to stealth interpreter and/or translator 16 for purposes of stealth interpretation, translation, transformation, and/or deconstruction. Stealth information structures may then be looked up in one or more (optionally programmable) policy manager/lookup tables/databases 15 using path 15-16 to determine switching, routing, prioritization, stealth information, and/or other processing information which the device 1a, 1e, 1f, 1g, 2, 3a, 3b, 4, 5a, 5e, 5f, and/or 5g may act upon. These actions may include using the information internally, externally, modifying the information in some way, and/or transferring the stealth information structure, either in stealth form or non-stealth form, over path 16-103 to electrical, optical, and/or other switching matrix/fabric 103. Stealth interpreter and/or translator 16 may be included functionally in the same unit as input buffer$_N$ 45.

In FIG. 13, a standard and/or stealth information structure may be transferred, switched, and/or routed out of electrical, optical, and/or other switching matrix/fabric 103 over path 70-103 to output buffer$_N$ 70. From output buffer$_N$ 70, standard and/or stealth information structures may be looked up directly through path 70-15 without using stealth assembler 20 in one or more lookup tables/databases 15, to determine switching, routing, prioritization, stealth information, and/or other processing information, which the device(s) 1a, 1e, 1f, 1g, 2, 3a, 3b, 4, 5a, 5e, 5f, and/or 5g may act upon. These actions may include using the information internally, externally, modifying the information in some way, and/or transferring the standard and/or stealth information structures out wireless, wired, and/or optical communications or communications path outputs Out$_N$ 29a2. Note that output buffer$_N$ 70 may store multiple packets and/or information structures of various types (packets, cells, frames, etc.; stealth and/or non-stealth) and in multiple queues.

Alternatively, stealth information structures may be transferred, switched, and/or routed out of electrical, optical, and/or other switching matrix/fabric 103 over path 20-103 to stealth assemblers and/or translators 20 which may be used to assemble, interpret, translate, transform, construct, and/or modify stealth information structures. Stealth information structures may be looked up in one or more lookup tables/databases 15 using path 15-20 to determine switching, routing, prioritization, stealth information, and/or other processing information which the device 1a, 1e, 1f, 1g, 2, 3a, 3b, 4, 5a, 5e, 5f, and/or 5g may act upon. These actions may include using the information internally, externally, modifying the information in some way, and/or transferring the stealth information structure, either in stealth form or non-stealth form, over path 70-20 to output buffer$_N$ 70. Output buffer$_N$ 70 may then store the information structure, modify it, and/or transfer it out wireless, wired, and/or optical communications or communications path outputs Out$_N$ 29a2. Stealth assembler and/or translator 20 may be included functionally in the same unit as output buffer$_N$ 70. Note that output buffer$_N$ 70 may store multiple packets and/or information structures of various types (packets, cells, frames, etc.; stealth and/or non-stealth) in multiple queues and priorities before transferring them.

FIG. 14 is a block diagram which shows an example of Time-Scheduled Stealth Packet Switching. The present invention may scramble the times for secret packet transmission(s) and those secret times may be distributed to the appropriate nodes in the path. The transmission times can be secretly generated and shared, or they may be generated individually at each node.

FIG. 14 illustrates exemplary secret transfer times which may be exchanged among various nodes 2, 3, 4 and/or end-user devices 1, 5 such that secret transfer times are established for various stealth packets and/or encrypted information structures. This transfer approach enables secret times to be exchanged across a time-based network for "secret" sessions of secure and/or stealth packets. These times could be generated by pseudo-random number generators (at one central point and then sent to each node); or they could be generated at individual nodes separately (including, but not limited to, for example, by sharing a seed value and/or a key), and/or any other method such that the scheduled and/or reserved times are secret from the outside world, but known to the routers/devices that need to know.

Illustrative synchronization mechanism 6 may be a clock, synchronization packets sent from node to node, beacon frames, and/or any other synchronization method, and is used to illustrate synchronizing various nodes 2, 3, 4, 1, and/or 5 through synchronization components 22, 23, and/or 24. End-user nodes 1 and/or 5 may also have synchronization components (not shown). Reservation managers 130 communicate with each other to exchange the reserved transfer times over various wireless, wired, and/or optical communication paths 26, and record these transfer times on their event schedules 129. Transfer times may be absolute and/or relative to some other events such as synchronization packets, beacon frames, etc. Time-based networks are described in more detail in U.S. PTO Disclosure Document No. 431129, which has been previously incorporated herein by reference.

I claim:

1. A method for transferring information structures, comprising the steps of:
    receiving a first information structure with rule violations;
    modifying said first information structure such that said rule violations are removed, thereby forming a second information structure without said rule violations; and
    wherein said rule violations comprise one or more actions from the group consisting of violating packet structure rules, altering packet format, altering packet length, altering byte organization, violating content rules, violating pattern rules, causing bit rate violations, causing timing violations, causing synchronization violations, causing encoding violations, adding noise, causing amplitude violations, causing phase violations, causing strength violations, causing frequency violations, causing procedural violations, causing errors, causing faults, altering fields, violating protocol rules, adding one or more bits, deleting one or more bits, rearranging one or more bits, transposing one or more bits, transforming one or more bits, substituting one or more bits, permutating one or more bits, inverting one or more bits, scrambling bits, repeating bits, whitening bits, encrypting one or more bits, altering clock synchronization, altering clock phasing, altering clock timing, altering packet subsections, altering preambles, altering synchronization bits, altering start of frame delimiters, altering headers, altering trailers, and altering flags.

2. The method of claim 1, wherein said rule violations comprise one or more characteristics from the group consisting of encrypted, non-encrypted, partially encrypted, fixed, non-fixed, repeating, non-repeating, programmable, previously known, previously unknown, random, pseudorandom, variable, predictably variable, dynamic, and rotating.

3. The method of claim 1, wherein said rule violations comprise one or more transmission technologies selected from the group consisting of wired, wireless, optical, ultra wide band, wavelets, time division multiplexing, spread spectrum, frequency hopping, direct sequence, high rate/direct sequence spread spectrum, orthogonal frequency division multiplexing, wave-division multiplexing, dense wave division multiplexing, and discrete multi-tone.

4. The method of claim 1, wherein said rule violations are of one or more standards from the group consisting of ANSI standards, IEEE standards, IEEE 802 standards, IEEE 803, IEEE 802.X, IEEE 802.11, IEEE 802.11x, IEEE 802.11a, IEEE 802.11b, IEEE 802.11g, IEEE 802.16, IEEE 802.16x, IETF (Internet Engineering Task Force) standards, TCP standards, IP standards, UDP standards, Physical Layer Convergence Procedure, PHY standards, Carrier Sense Multiple Access/Collision Avoidance standards, Carrier Sense Multiple Access/Collision Detection standards, Generic Route Encapsulation, Physical Media Dependent standards, Frequency Hopping standards, Direct Sequence standards, High Rate/Direct Sequence Spread Spectrum standards, Gaussian Frequency Shift Keying standards, spreading standards, correlation standards, pseudo-random noise codes, barker sequences, chipping sequences, Orthogonal Frequency Division Multiplexing standards, scrambling standards, whitening standards, Local Area Network standards, Metropolitan Area Network standards, Wide Area Network standards, Storage Area Network Standards, Personal Area Network standards, inter-processor communication standards, Radio Frequency Identification standards, and point to point tunneling protocol standards.

5. The method of claim 1, wherein said step of transferring comprises one or more actions selected from the group comprising decoding, receiving, switching, routing, forwarding, bypassing, intercepting, detecting, interpreting, and analyzing.

6. A network system for transferring information structures, comprising:
    one or more first network elements capable of transferring one or more information structures in accordance with one or more information structure rule violations;
    one or more second network elements capable of receiving and correctly deconstructing said one or more information structures in accordance with said one or more information structure rule violations;
    a communications medium between said one or more first network elements and said one or more second network elements for transferring said one or more information structures in accordance with said one or more information structure rule violations; and
    wherein said rule violations comprise one or more actions from the group consisting of violating packet structure rules, altering packet format, altering packet length, altering byte organization, violating content rules, violating pattern rules, causing bit rate violations, causing timing violations, causing synchronization violations, causing encoding violations, adding noise, causing amplitude violations, causing phase violations, causing strength violations, causing frequency violations, causing procedural violations, causing errors, causing faults, altering fields, violating protocol rules, adding one or more bits, deleting one or more bits, rearranging one or more bits, transposing one or more bits, transforming one or more bits, substituting one or more bits, permutating one or more bits, inverting one or more bits, scrambling bits, repeating bits, whitening bits, encrypting one or more bits, altering clock synchronization, altering clock phasing, altering clock timing, altering packet subsections, altering preambles, altering synchronization bits, altering start of frame delimiters, altering headers, altering trailers, and altering flags.

7. The network of claim 6, wherein said one or more first network elements is further capable of transferring one or more information structures without rule violations.

8. The network of claim 6, wherein said one or more second network elements is further capable of receiving one or more information structures without rule violations.

9. The network of claim 6, wherein said rule violations comprise one or more characteristics from the group consisting of encrypted, non-encrypted, partially encrypted, fixed, non-fixed, repeating, non-repeating, programmable, previously known, previously unknown, random, pseudorandom, variable, predictably variable, dynamic, and rotating.

10. The network of claim 6, wherein said rule violations comprise one or more communication methods selected from the group consisting of ultra wide band, wavelets, time division multiplexing, spread spectrum, frequency hopping, direct sequence, high rate/direct sequence spread spectrum, orthogonal frequency division multiplexing, wave-division multiplexing, dense wave division multiplexing, and discrete multi-tone.

11. The network of claim 6, wherein said rule violations are of one or more standards from the group consisting of ANSI standards, IEEE standards, IEEE 802 standards, IEEE 803, IEEE 802.X, IEEE 802.11, IEEE 802.11x, IEEE 802.11a, IEEE 802.11b, IEEE 802.11g, IEEE 802.16, IEEE 802.16x, IETF (Internet Engineering Task Force) standards, TCP standards, IP standards, UDP standards, Physical Layer Convergence Procedure, PHY standards, Carrier Sense Multiple Access/Collision Avoidance standards, Carrier Sense Multiple Access/Collision Detection standards, Generic Route Encapsulation, Physical Media Dependent standards, Frequency Hopping standards, Direct Sequence standards, High Rate/Direct Sequence Spread Spectrum standards, Gaussian Frequency Shift Keying standards, spreading standards, correlation standards, pseudo-random noise codes, barker sequences, chipping sequences, Orthogonal Frequency Division Multiplexing standards, scrambling standards, whitening standards, Local Area Network standards, Metropolitan Area Network standards, Wide Area Network standards, Storage Area Network Standards, Personal Area Network standards, inter-processor communication standards, Radio Frequency Identification standards, and point to point tunneling protocol standards.

12. The network of claim 6 wherein said communications medium comprises one or more types from the group consisting of wired communications media, wireless communications media, optical communications media, shared communications media, non-shared communications media, local area network communications media, mesh communications media, chip-to-chip communications media, grid computing communications media, and point-to-point communications media.

13. The network of claim 6 wherein sessions may be set up and torn down between said one or more first network elements and said one or more second network elements for transferring said one or more information structures with said one or more information structure rule violations.

14. A device for transferring information structures with rule violations, comprising:
one or more input sections for receiving one or more information structures with one or more information structure rule violations;
wherein said rule violations comprise one or more actions from the group consisting of violating packet structure rules, altering packet format, altering packet length, altering byte organization, violating content rules, violating pattern rules, causing bit rate violations, causing timing violations, causing synchronization violations, causing encoding violations, adding noise, causing amplitude violations, causing phase violations, causing strength violations, causing frequency violations, causing procedural violations, causing errors, causing faults, altering fields, violating protocol rules, adding one or more bits, deleting one or more bits, rearranging one or more bits, transposing one or more bits, transforming one or more bits, substituting one or more bits, permutating one or more bits, inverting one or more bits, scrambling bits, repeating bits, whitening bits, encrypting one or more bits, altering clock synchronization, altering clock phasing, altering clock timing, altering packet subsections, altering preambles, altering synchronization bits, altering start of frame delimiters, altering headers, altering trailers, and altering flags.

15. The device of claim 14 further comprising a policy manager, wherein said policy manager controls correct deconstruction of said one or more information structure rule violations for said one or more information structures in said one or more input sections.

16. The device of claim 15, wherein said policy manager is programmable to implement programmable information structure rule violations and rule violation deconstruction.

17. The device of claim 14, further comprising one or more switching fabrics for switching one or more information structures with rule violations and one or more standard information structures without rule violations from said one or more input sections to one or more output sections.

18. The device of claim 14, wherein said rule violations comprise one or more characteristics from the group consisting of encrypted, non-encrypted, partially encrypted, fixed, non-fixed, repeating, non-repeating, programmable, previously known, previously unknown, random, pseudorandom, variable, predictably variable, dynamic, and rotating.

19. The device of claim 14, wherein said rule violations comprise one or more communication methods selected from the group consisting of ultra wide band, wavelets, time division multiplexing, spread spectrum, frequency hopping, direct sequence, high rate/direct sequence spread spectrum, orthogonal frequency division multiplexing, wave-division multiplexing, dense wave division multiplexing, and discrete multi-tone.

20. The device of claim 14, wherein said rule violations are of one or more standards from the group consisting of ANSI standards, IEEE standards, IEEE 802 standards, IEEE 803, IEEE 802.X, IEEE 802.11, IEEE 802.11x, IEEE 802.11a, IEEE 802.11b, IEEE 802.11g, IEEE 802.16, IEEE 802.16x, IETF (Internet Engineering Task Force) standards, TCP standards, IP standards, UDP standards, Physical Layer Convergence Procedure, PHY standards, Carrier Sense Multiple Access/Collision Avoidance standards, Carrier Sense Multiple Access/Collision Detection standards, Generic Route Encapsulation, Physical Media Dependent standards, Frequency Hopping standards, Direct Sequence standards, High Rate/Direct Sequence Spread Spectrum standards, Gaussian Frequency Shift Keying standards, spreading standards, correlation standards, pseudo-random noise codes, barker sequences, chipping sequences, Orthogonal Frequency Division Multiplexing standards, scrambling standards, whitening standards, Local Area Network standards, Metropolitan Area Network standards, Wide Area Network standards, Storage Area Network Standards, Personal Area Network standards, inter-processor communication standards, Radio Frequency Identification standards, and point to point tunneling protocol standards.

* * * * *